(12) United States Patent
Ito et al.

(10) Patent No.: US 9,399,974 B2
(45) Date of Patent: Jul. 26, 2016

(54) MOTORCYCLE

(71) Applicant: SUZUKI MOTOR CORPORATION, Hamamatsu-shi, Shizuoka (JP)

(72) Inventors: Keisuke Ito, Hamamatsu (JP); Ken Shibano, Hamamatsu (JP); Yoshisato Inayama, Hamamatsu (JP); Kei Hasegawa, Hamamatsu (JP); Yuta Endo, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 14/495,481

(22) Filed: Sep. 24, 2014

(65) Prior Publication Data

US 2015/0083513 A1    Mar. 26, 2015

(30) Foreign Application Priority Data

Sep. 25, 2013 (JP) ................. 2013-198488
Oct. 4, 2013 (JP) ................. 2013-209395
Oct. 4, 2013 (JP) ................. 2013-209542

(51) Int. Cl.
| | |
|---|---|
| *B60K 13/02* | (2006.01) |
| *F02M 35/16* | (2006.01) |
| *F02B 29/04* | (2006.01) |
| *F02B 61/02* | (2006.01) |
| *F02D 9/08* | (2006.01) |
| *F02M 35/10* | (2006.01) |
| *F02M 35/112* | (2006.01) |

(52) U.S. Cl.
CPC ............. *F02M 35/162* (2013.01); *B60K 13/02* (2013.01); *F02B 29/0418* (2013.01); *F02B 29/0456* (2013.01); *F02B 61/02* (2013.01); *F02D 9/08* (2013.01); *F02M 35/10157* (2013.01); *F02M 35/10216* (2013.01); *F02M 35/112* (2013.01); *F02D 2700/0251* (2013.01); *F02M 35/10209* (2013.01); *Y02T 10/144* (2013.01); *Y02T 10/146* (2013.01)

(58) Field of Classification Search
CPC ....................... F02M 35/162; F02M 35/10157
USPC ....................................................... 180/219
See application file for complete search history.

(56) References Cited

U.S. PATENT DOCUMENTS

| | | | | |
|---|---|---|---|---|
| 4,396,085 | A | * | 8/1983 | Inoue et al. .................. 180/219 |
| 4,427,087 | A | * | 1/1984 | Inoue et al. .................. 180/219 |
| 4,445,336 | A | * | 5/1984 | Inoue .......................... 60/605.1 |
| 4,475,617 | A | * | 10/1984 | Minami et al. ............... 180/219 |
| 4,480,712 | A | * | 11/1984 | Inoue et al. .................. 180/219 |
| 4,482,024 | A | * | 11/1984 | Matsuda et al. .............. 180/219 |
| 4,495,773 | A | * | 1/1985 | Inoue et al. .................. 60/605.1 |
| 4,550,794 | A | * | 11/1985 | Inoue et al. .................. 180/219 |
| 4,735,178 | A | * | 4/1988 | Inoue et al. .................. 180/219 |
| 4,760,703 | A | * | 8/1988 | Minami et al. .............. 60/605.1 |

(Continued)

FOREIGN PATENT DOCUMENTS

| | | |
|---|---|---|
| EP | 2 075 181 | 7/2009 |
| JP | 2009-173259 | 8/2009 |
| JP | 2010-163891 | 7/2010 |

*Primary Examiner* — Joseph Rocca
*Assistant Examiner* — Michael Stabley
(74) *Attorney, Agent, or Firm* — Troutman Sanders LLP

(57) ABSTRACT

One or more throttle bodies and a surge tank are disposed behind a cylinder head, and an intercooler is disposed by being adjacent to the surge tank at a position behind the cylinder head and the one or more throttle bodies. A supercharger is provided in front of the intercooler.

17 Claims, 36 Drawing Sheets

(56) References Cited

U.S. PATENT DOCUMENTS

| | | | |
|---|---|---|---|
| 5,421,296 A * | 6/1995 | Hitomi et al. | 123/184.53 |
| 6,962,225 B2 * | 11/2005 | Conte | 180/68.3 |
| 7,051,824 B1 * | 5/2006 | Jones et al. | 180/68.3 |
| 7,152,706 B2 * | 12/2006 | Pichler et al. | 180/68.3 |
| 8,584,783 B2 * | 11/2013 | Saeki et al. | 180/219 |
| 8,857,552 B2 * | 10/2014 | Oltmans | 180/219 |
| 2010/0175946 A1 * | 7/2010 | Karube et al. | 180/291 |
| 2012/0192839 A1 * | 8/2012 | Arima et al. | 123/559.1 |
| 2012/0260896 A1 * | 10/2012 | Saeki et al. | 123/559.1 |
| 2012/0267182 A1 * | 10/2012 | Saeki et al. | 180/219 |

* cited by examiner

// MOTORCYCLE

CROSS-REFERENCE TO RELATED APPLICATIONS

This application is based upon and claims the benefit of priority of the prior Japanese Patent Application No. 2013-198488, filed on Sep. 25, 2013, the prior Japanese Patent Application No. 2013-209395, filed on Oct. 4, 2013, and the prior Japanese Patent Application No. 2013-209542, filed on Oct. 4, 2013, the entire contents of which are incorporated herein by reference.

BACKGROUND OF THE INVENTION

1. Field of the Invention

The present invention relates to a motorcycle, and particularly relates to an arrangement structure of parts in a periphery of an intake system of an engine of the motorcycle.

2. Description of the Related Art

In order to improve a fuel economy of an engine and to improve an engine power in a vehicle such as a motorcycle, there is a case where a reduction of engine displacement and a supercharger are combined, namely, a reduction of engine displacement and an improvement of intake efficiency realized by a supercharger are simultaneously conducted.

If the supercharger is used, a temperature of air pressurized by the supercharger becomes high, which causes, if no measure is taken, a reduction of intake efficiency. For cooling an intake air in order not to sacrifice the intake efficiency, an intercooler is added. When the supercharger is used as above, the intercooler is normally used at the same time.

[Patent Document 1] Japanese Laid-open Patent Publication No. 2010-163891

In the engine that uses the supercharger and the intercooler at the same time as described above, it is demanded to efficiently cool the intake air by the intercooler, and to perform effective disposition of parts and pipe laying to reduce a turbo lag (lag in response). Conventionally, in a motorcycle and the like, it has not been easy to deal with this type of demand within a limited narrow space.

Note that Patent Document 1 discloses a structure in which a throttle body, an intercooler, and an air cleaner are disposed, in this order, between rails of a seat, at a position behind a cylinder head of an engine.

SUMMARY OF THE INVENTION

In view of such circumstances, the present invention has an object to provide a motorcycle realizing an effective arrangement structure of parts in a periphery of an engine intake system, in particular.

A motorcycle of the present invention is characterized in that it includes: an engine having one or more exhaust ports to which one or more exhaust pipes is/are connected at a front side of a cylinder head, and one or more intake ports to which one or more throttle bodies is/are connected at a rear side of the cylinder head; a supercharger disposed at a front side of the engine, and compressing a sucked air for combustion; an intercooler cooling the air compressed by the supercharger; and a surge tank making the air from the intercooler flow to the one or more throttle bodies, in which the one or more throttle bodies and the surge tank are disposed behind the cylinder head, the intercooler is disposed by being adjacent to the surge tank at a position behind the cylinder head and the one or more throttle bodies, and the supercharger is provided in front of the intercooler.

DETAILED DESCRIPTION OF THE PREFERRED EMBODIMENTS (First Embodiment)

Hereinafter, preferred embodiments of a motorcycle of the present invention will be described based on the drawings.

Figure 1:
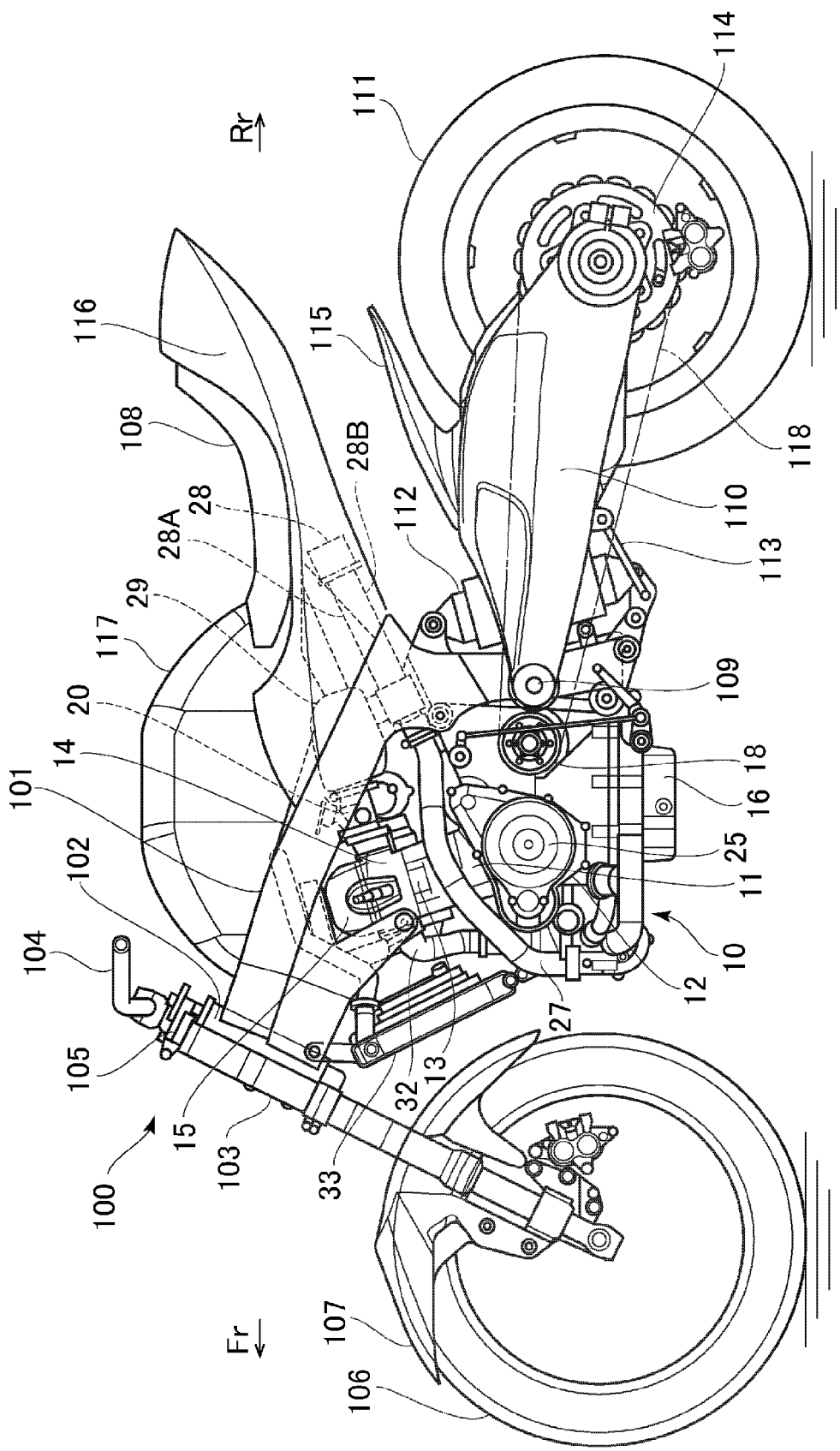
FIG. 1 is a side view of a motorcycle of a first embodiment.
Figure 2:
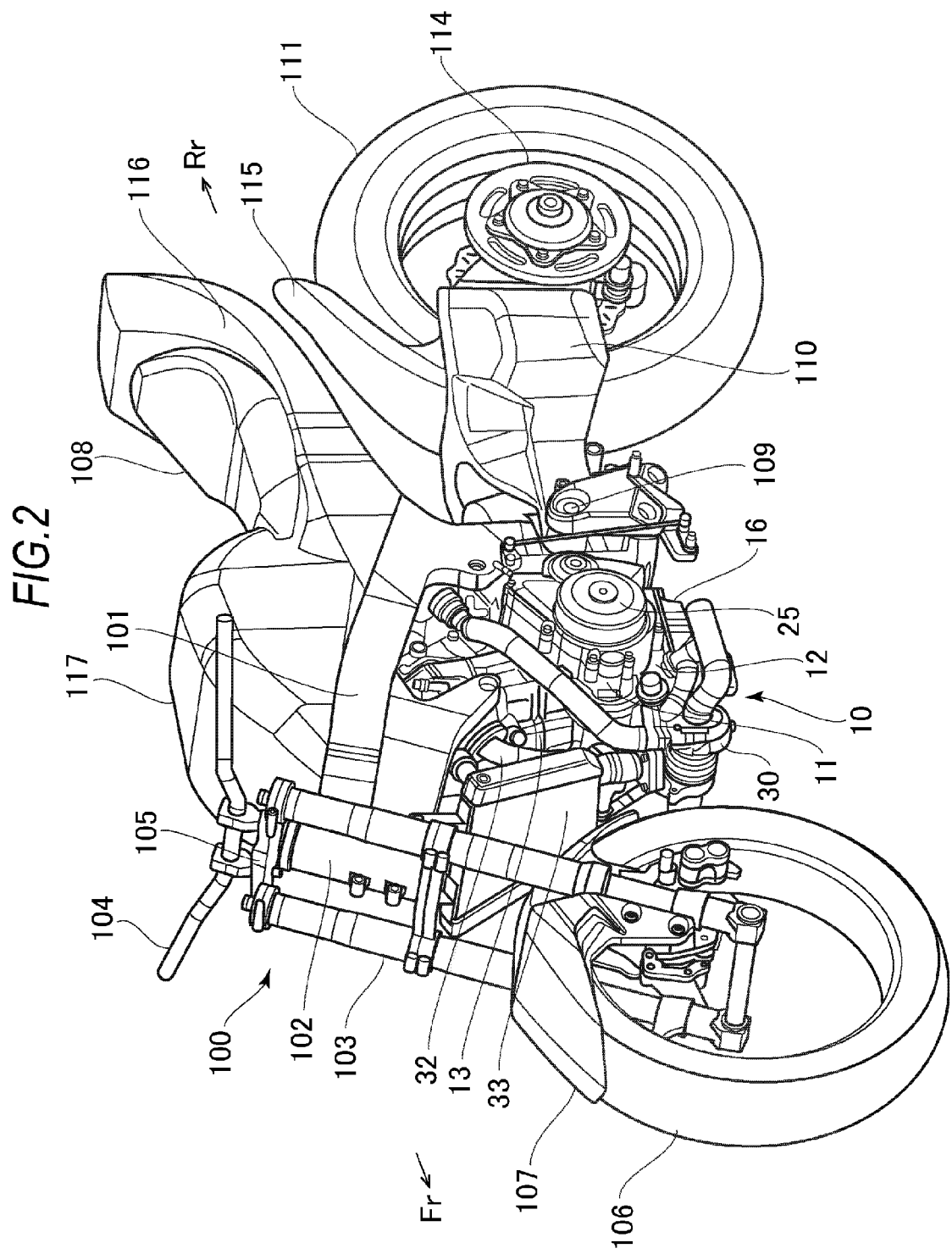
FIG. 2 is a perspective view of the motorcycle of the first embodiment when seen from the front side.
Figure 3:
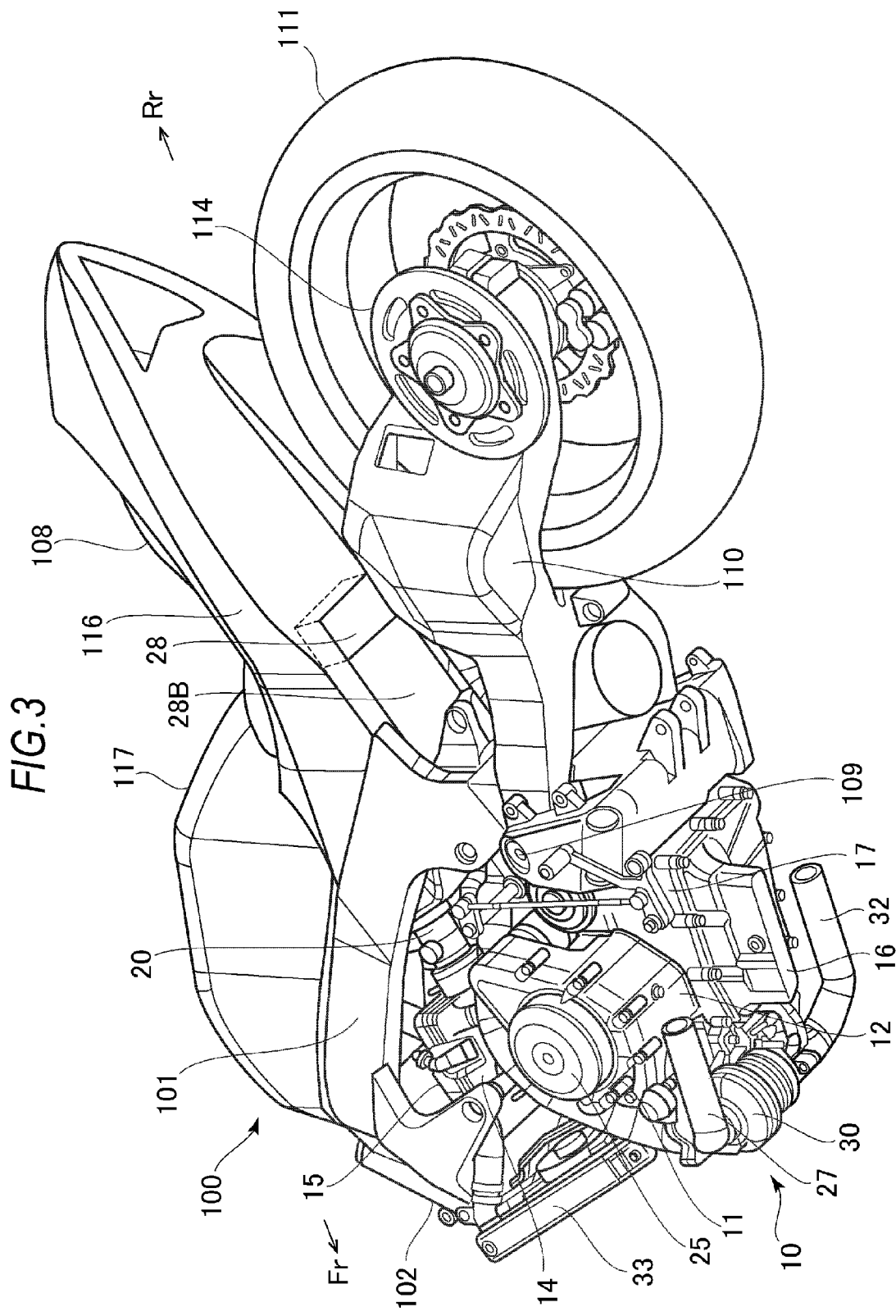
FIG. 3 is a perspective view of the motorcycle of the first embodiment when seen from the rear side.

FIG. 1 to FIG. 3 illustrate a schematic configuration of a motorcycle 100 as an application example of the present invention, in which FIG. 1 is a side view, FIG. 2 is a perspective view when seen from the front side, and FIG. 3 is a perspective view when seen from the rear side. First, the entire configuration of the motorcycle 100 will be described by using these drawings. Note that in the drawings used in the following description including FIG. 1 to FIG. 3, a front side, a rear side, a lateral right side, and a lateral left side of a vehicle are indicated by an arrow mark Fr, an arrow mark Rr, an arrow mark R, and an arrow mark L, respectively, according to need.

In FIG. 1 to FIG. 3, on front portions of vehicle body frames 101 (main frames) made of steel or aluminum alloy material, there are provided two right and left front forks 103 supported to be able to pivot in a right-and-left direction by a steering head pipe 102. On upper ends of the front forks 103, a handle bar 104 is fixed via a steering bracket 105. On lower portions of the front forks 103, a front wheel 106 is rotatably supported, and a front fender 107 is fixed so as to cover a part above the front wheel 106.

The vehicle body frames 101 are integrally coupled to a rear portion of the steering head pipe 102, the pair of right and left frames are branched into a two-pronged shape toward the rear direction, and extend rearward and downward from the steering head pipe 102 while enlarging a width thereof. In this case, the vehicle body frames 101 may be a so-called twin-spar-type frame adopted as being suitable for vehicles and the like requiring high speed performance. Note that although an illustration is omitted, a seat rail extends rearward by being moderately inclined rearward and upward from the vicinity of rear portions of the vehicle body frames 101, and supports a seat 108 (seating seat). Further, the right and left parts of the vehicle body frames 101 are curved or bent downward at the vicinity of rear end portions thereof, and are coupled to each other at lower ends thereof, so that as a whole, the vehicle body frames 101 have a three-dimensional structure having space inside.

A swing arm 110 is coupled to the vicinity of a lower side of rear ends of the vehicle body frames 101 via a pivot shaft 109 so as to be swingable in an up-and-down direction. A rear wheel 111 is rotatably supported on a rear end of the swing arm 110. The rear wheel 111 is supported on a rear portion side of the swing arm 110 in a cantilever manner. A rear shock absorber 112 is laid between the vehicle body frames 101 and the swing arm 110. A lower end side of the rear shock absorber 112 is coupled to both of the vehicle body frames 101 and the swing arm 110 via a link mechanism 113. A driven sprocket 114 around which a chain 118 for transmitting motive power of a later-described engine is wound is fitted to the rear wheel 111, and the rear wheel 111 is driven to rotate via the driven sprocket 114. In an immediate periphery of the rear wheel 111, an inner fender 115 covering the vicinity of a front upper portion of the rear wheel 111 is provided.

In the vehicle exterior, mainly a front portion and both right and left side portions of the vehicle are covered by cowlings or side cowls, although a detailed illustration is omitted. Further, in a rear portion of the vehicle, a seat cover or a seat cowl 116 covers a periphery of the seat 108, and by these exterior members, an outer form of the vehicle having a so-called streamlined shape is formed. Note that in front of the seat 108, a fuel tank 117 is mounted.

Figure 4:
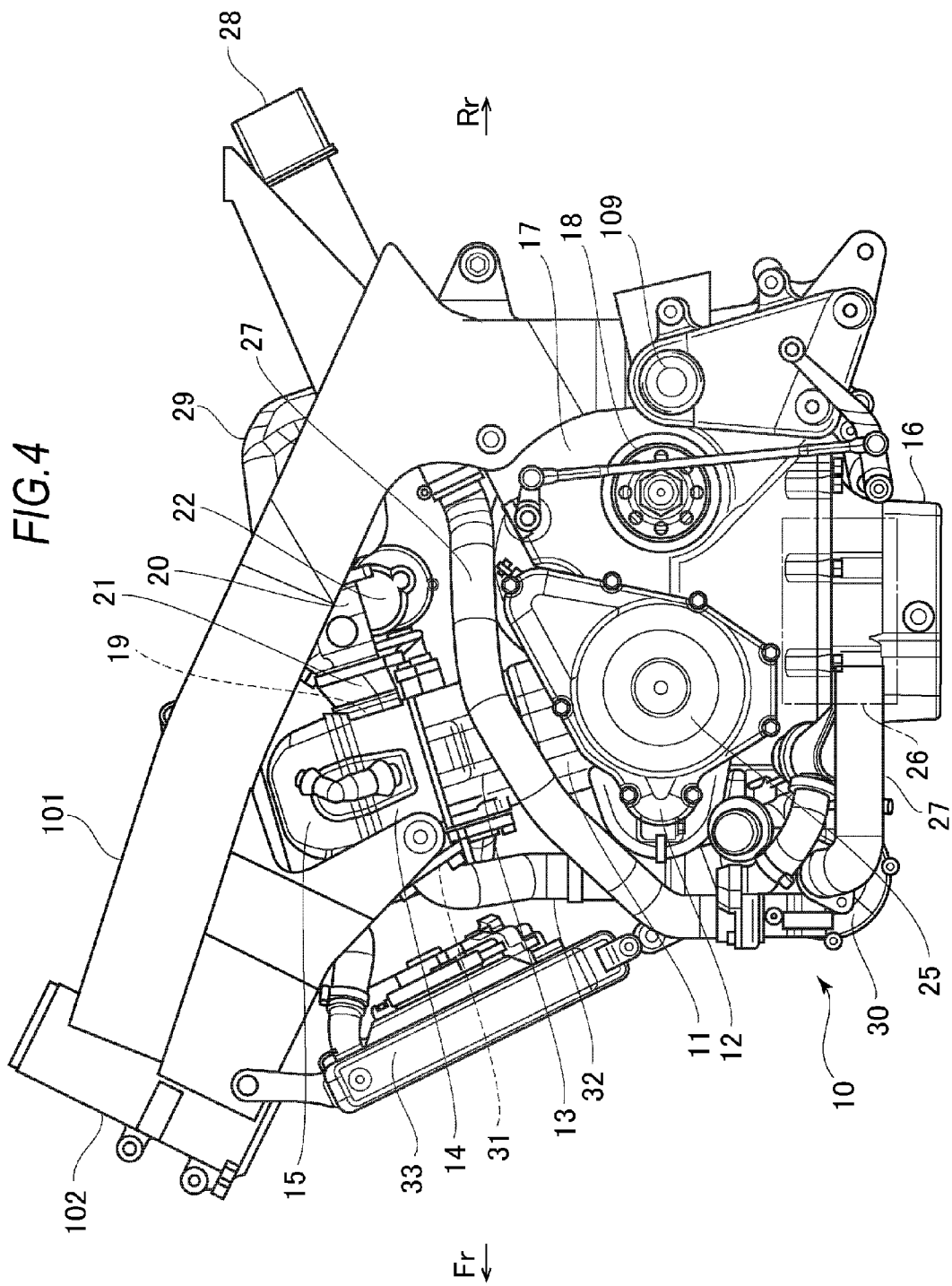
FIG. 4 is a side view of a periphery of an engine unit of the first embodiment.
Figure 5:
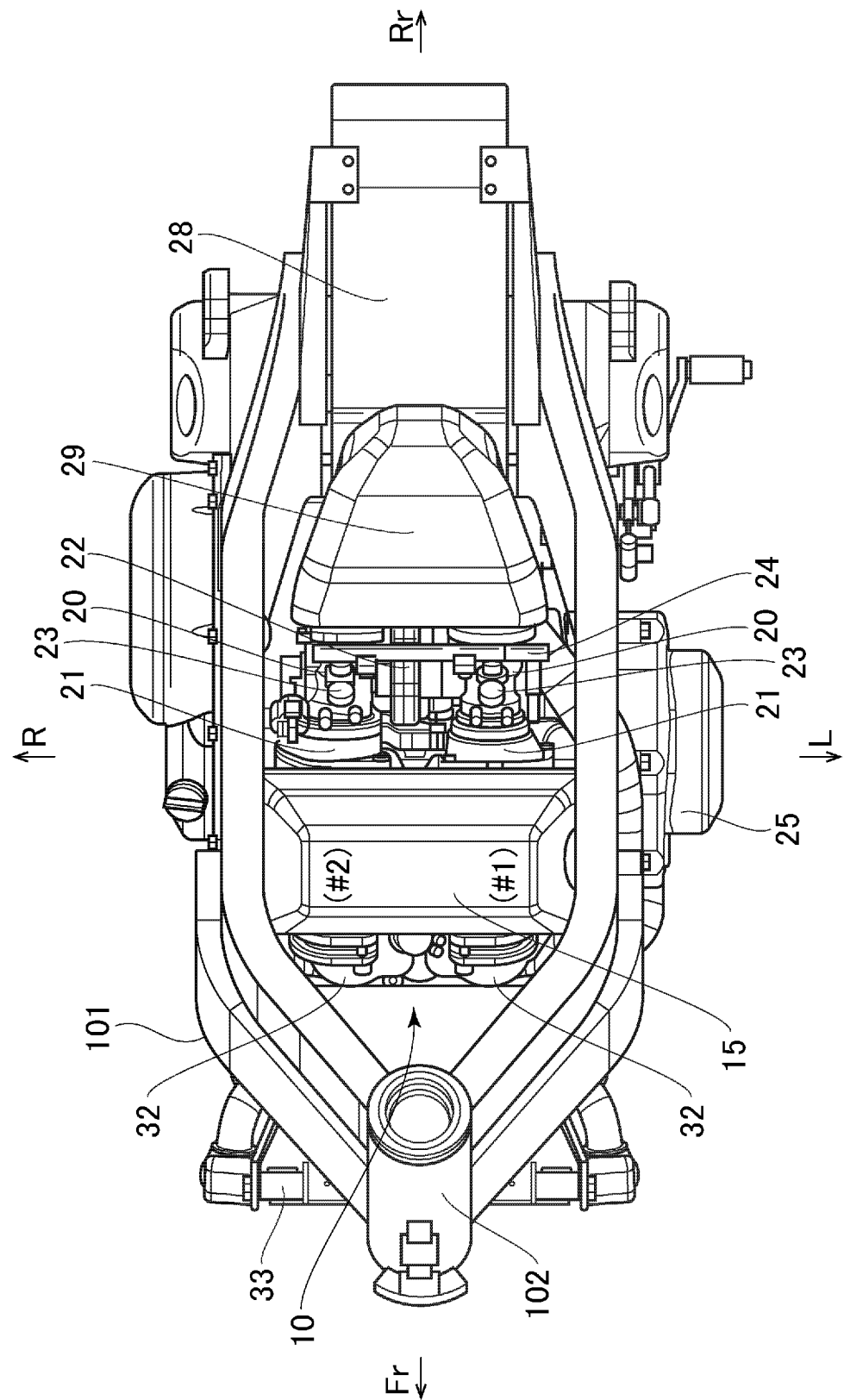
FIG. 5 is a top view of the periphery of the engine unit of the first embodiment.
Figure 6:
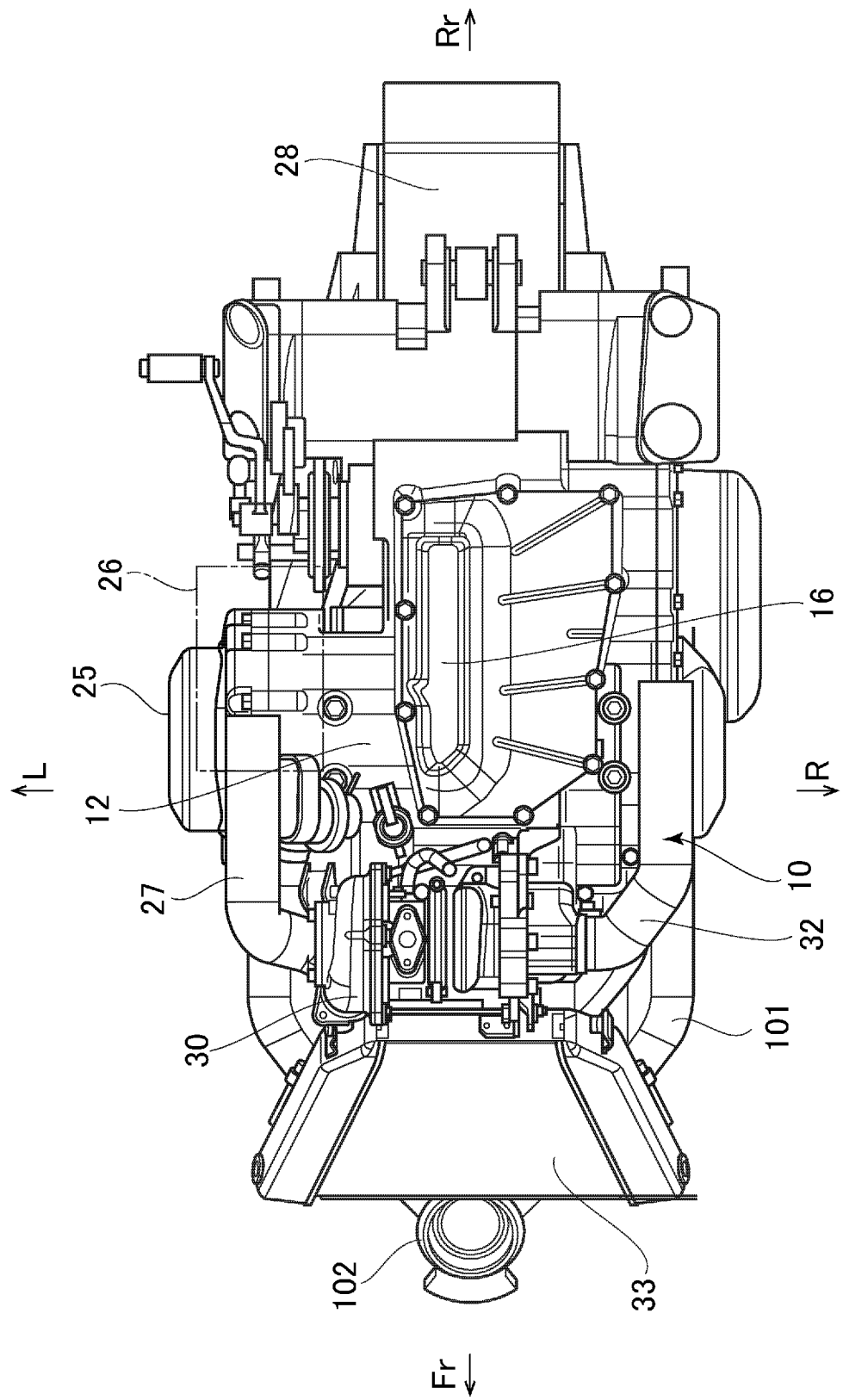
FIG. 6 is a bottom view of the periphery of the engine unit of the first embodiment.

An engine unit 10 is mounted at a substantially center portion of the vehicle of the motorcycle 100. As illustrated in FIG. 4 to FIG. 6, the engine unit 10 has an engine 11. In the present embodiment, a water-cooled multicylinder four-cycle gasoline engine is used, and the engine 11 corresponds to a parallel two-cylinder engine in which a #1 cylinder and a #2 cylinder are disposed side by side in the right-and-left direction (in a vehicle width direction). In the engine 11, above a crankcase 12 housing a crankshaft horizontally supported in the right-and-left direction, cylinders 13, a cylinder head 14, and a cylinder head cover 15 are integrally coupled so as to be stacked sequentially. As illustrated in FIG. 3, an oil pan 16 is attached to a lowest portion of the crankcase 12. Note that a cylinder axis of the engine 11 is moderately inclined forward, and the oil pan 16 is substantially disposed by being biased on the left side. The engine 11 is suspended on the vehicle body frames 101 via a plurality of engine mounts to be integrally coupled to and supported by an inner side of the vehicle body frames 101, and the engine 11 itself works as a rigid member of the vehicle body frames 101.

A transmission case 17 is coupled to a rear portion of the crankcase 12. In the transmission case 17, a counter shaft and a plurality of transmission gears, which are not illustrated, are arranged. The motive power of the engine unit 10 is transmitted from the crankshaft to a transmission, and then is finally transmitted to a drive sprocket 18 being an output end of the engine unit 10 (refer to FIG. 4 and the like). By the motive power transmitted to the drive sprocket 18, the rear wheel 111 is driven to rotate via the chain 118 (refer to FIG. 1) and the driven sprocket 114.

Note that the crankcase 12 and the transmission case 17 are mutually and integrally coupled to configure, as a whole, a casing assembly of the engine unit 10. A plurality of auxiliary machines including a starter motor for engine startup, a clutch device and the like are mounted on or coupled to appropriate places of this casing assembly, and the entire engine unit 10 including these is supported by the vehicle body frames 101.

The engine 11 is further provided with an intake system which supplies an air-fuel mixture made of an air (intake air) and a fuel which are supplied from an air cleaner and a fuel supply device, respectively, an exhaust system which discharges exhaust gas after combustion from the engine 11, a cooling system which cools the engine 11, a lubricating system which lubricates movable parts of the engine 11, and a control system (ECU; Engine Control Unit) which controls operations of the above-described systems. Based on the control by the control system, the engine unit 10 smoothly operates as a whole.

More concretely, first, in the intake system, both of the #1 and #2 cylinders have intake ports 19 (refer to FIG. 4) which are opened in a rear side of the cylinder head 14, and throttle bodies 20 are connected to the intake ports 19 via intake pipes 21. Throttle valves (not illustrated) which open/close intake air flow paths formed in the inside of the throttle bodies 20 in accordance with an accelerator opening degree, are fitted to the throttle bodies 20, and accordingly, a flow rate of air fed from the later-described air cleaner is controlled. In the present embodiment, throttle valve shafts of the #1 and #2 cylinders are disposed coaxially, and a valve driving mechanism 22 which electrically or electromagnetically drives the throttle valve shafts is provided. Meanwhile, injectors 23 for fuel injection are disposed on a downstream side of the throttle valves of the respective throttle bodies 20, and the fuel in the fuel tank 117 is supplied to these injectors 23 by a fuel pump. In this case, the respective injectors 23 are connected, at upper sides thereof, to a delivery pipe 24 suspended laterally in the vehicle width direction, so that the fuel is distributed from the delivery pipe 24 connected to the fuel pump. The respective injectors 23 inject the fuel to the intake air flow paths in the throttle bodies 20 at a predetermined timing based on the control by the control system, and accordingly, the air-fuel mixture with a predetermined air-fuel ratio is supplied to the cylinders 13 of the #1 and #2 cylinders.

Here, as illustrated in FIG. 4 or FIG. 6, on a lower portion of the engine 11, namely, on a portion below a magneto chamber 25 provided on the left side of the crankcase 12, an air cleaner 26 (refer to a dashed line indicated in FIG. 4 and the like) is adjacently disposed on the left side of the oil pan 16 with a predetermined interval. The air cleaner 26 has a box-shaped casing in which an air filter is fitted, and an air taken into the casing is cleaned by the air filter. An outlet port of the cleaned air is opened on a casing front surface portion of the air cleaner 26, and an air feed pipe 27 is connected to the outlet port. The air feed pipe 27 extends from the air cleaner 26 to go round to the front of the crankcase 12, thereafter curves upward, further passes on the left side of the cylinder 13, and is connected to an air-cooling intercooler 28, as illustrated in FIG. 4.

It is designed such that the intercooler 28 cools the air supplied from the air feed pipe 27, and the cooled air is supplied to the throttle bodies 20 of the #1 and #2 cylinders via a surge tank 29. Note that there is provided a supercharger 30 (turbocharger) which is disposed in the middle of the air feed pipe 27, namely, in front of the engine 11, and compresses the sucked air. Concrete configurations and the like of the intercooler 28, the supercharger 30 and the like will be described later.

Next, in the exhaust system, both of the #1 and #2 cylinders have exhaust ports 31 (refer to FIG. 4) which are opened on a front side of the cylinder head 14, and exhaust pipes 32 are connected to the exhaust ports 31. The exhaust pipes 32 of the respective cylinders once extend downward from the exhaust ports 31, join together in front of the cylinders 13 to be integrated, which then extends around to a right lower portion of the crankcase 12 and further extends rearward. A muffler is attached to a rear end of the exhaust pipe 32. Note that in the middle of the exhaust pipe 32, a driving portion side of the supercharger 30, namely, a turbine is disposed, and a compressor driven to rotate by this turbine is disposed in the middle of the air feed pipe 27. As above, the present embodiment adopts the turbocharger which pressurizes the air sucked from the air cleaner 26 by utilizing an exhaust stream of the engine 11 and supplies the pressurized air to the intercooler 28.

Further, although a detailed illustration is omitted, in the cooling system, a water jacket formed to make cooling water circulate therein is formed around a cylinder block including the cylinders 13, and a radiator 33 which cools the cooling water fed to the water jacket, is provided. Note that the radiator 33 is supported, by utilizing the vehicle body frames 101 and the like, on appropriate places of the vehicle body frames 101 and the like, at a front portion of the engine unit 10.

Further, the lubricating system for supplying lubricating oil to the movable parts of the engine unit 10 to lubricate the movable parts, is configured. This lubricating system includes valve driving devices formed in the crankshaft and the cylinder head 14, cam chains coupling them, the transmission, and so on. In the present embodiment, an ordinary oil pump is used for the lubricating system, and the oil pumped up from the oil pan 16 is sent to the lubricating system by this oil pump.

Figure 7:
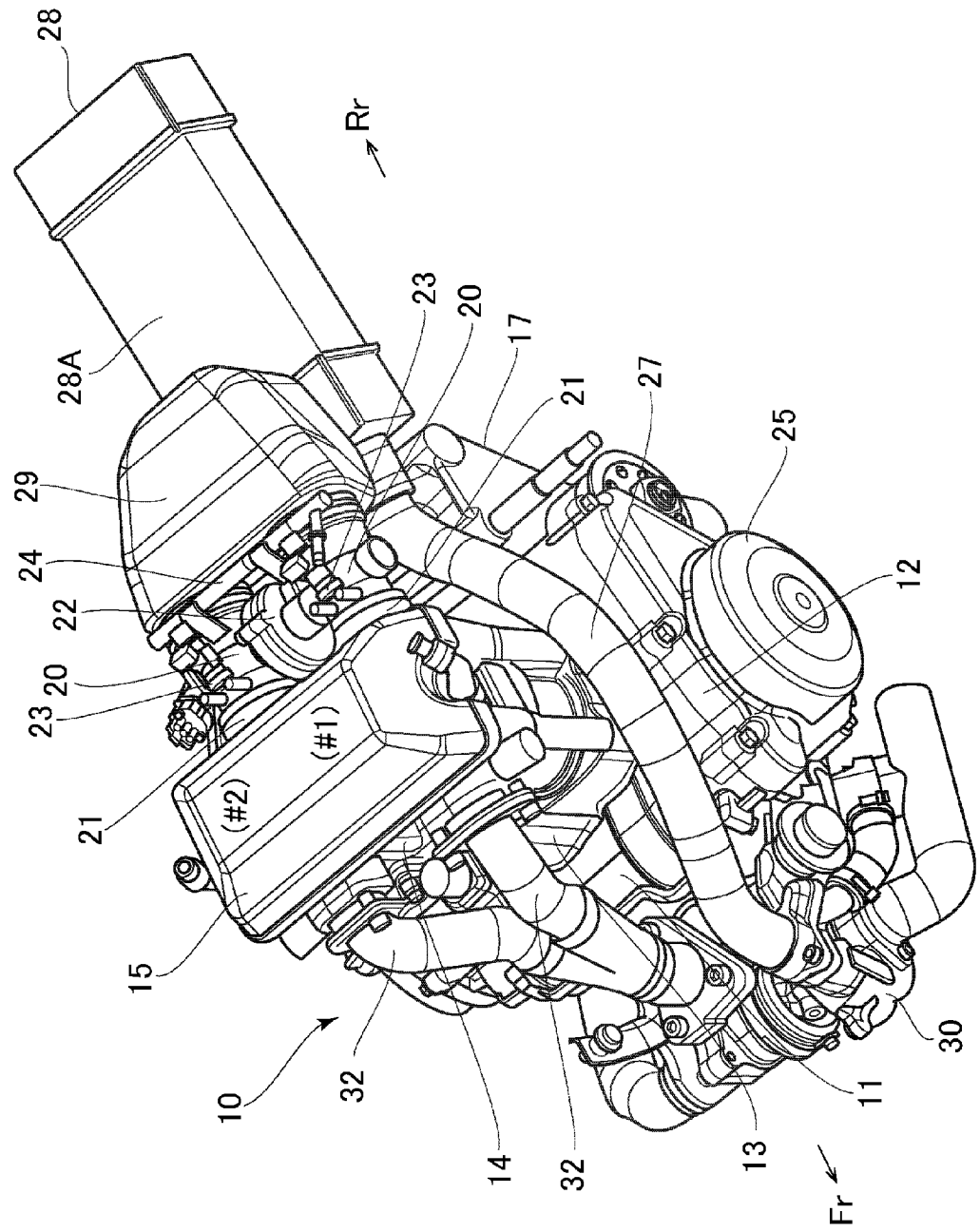
FIG. 7 is a perspective view of a periphery of an intake system of the engine unit of the first embodiment.

The periphery of the intake system of the engine unit 10 of the present embodiment will be described. As illustrated in FIG. 7, the throttle bodies 20 and the surge tank 29 are disposed behind the cylinder head 14, and the intercooler 28 is disposed by being adjacent to the surge tank 29 at a position behind the cylinder head 14 and the throttle bodies 20. Further, the supercharger 30 is provided in front of the intercooler 28.

Figure 8:
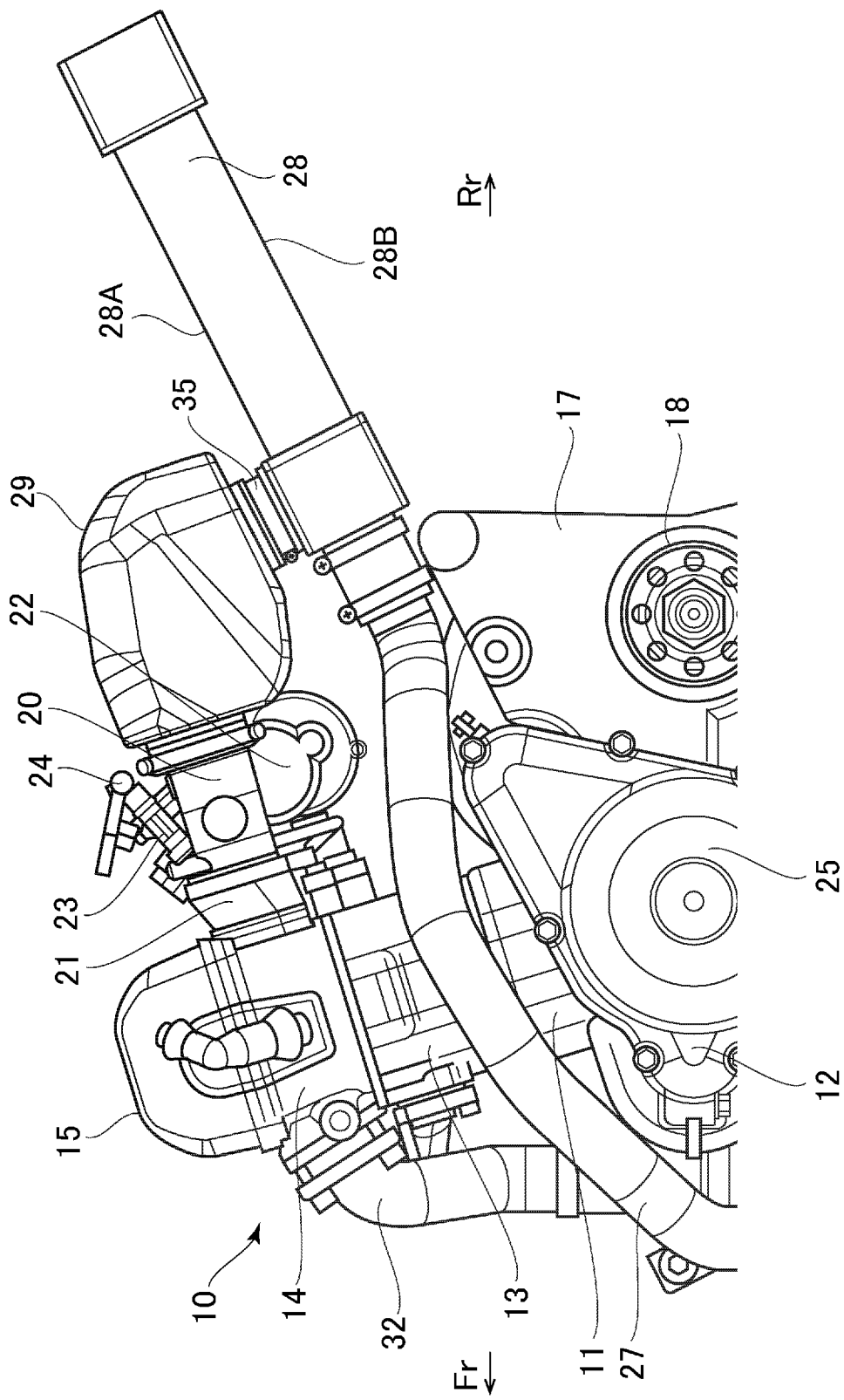
FIG. 8 is a left side view of an engine including the periphery of the intake system of the first embodiment.
Figure 9:
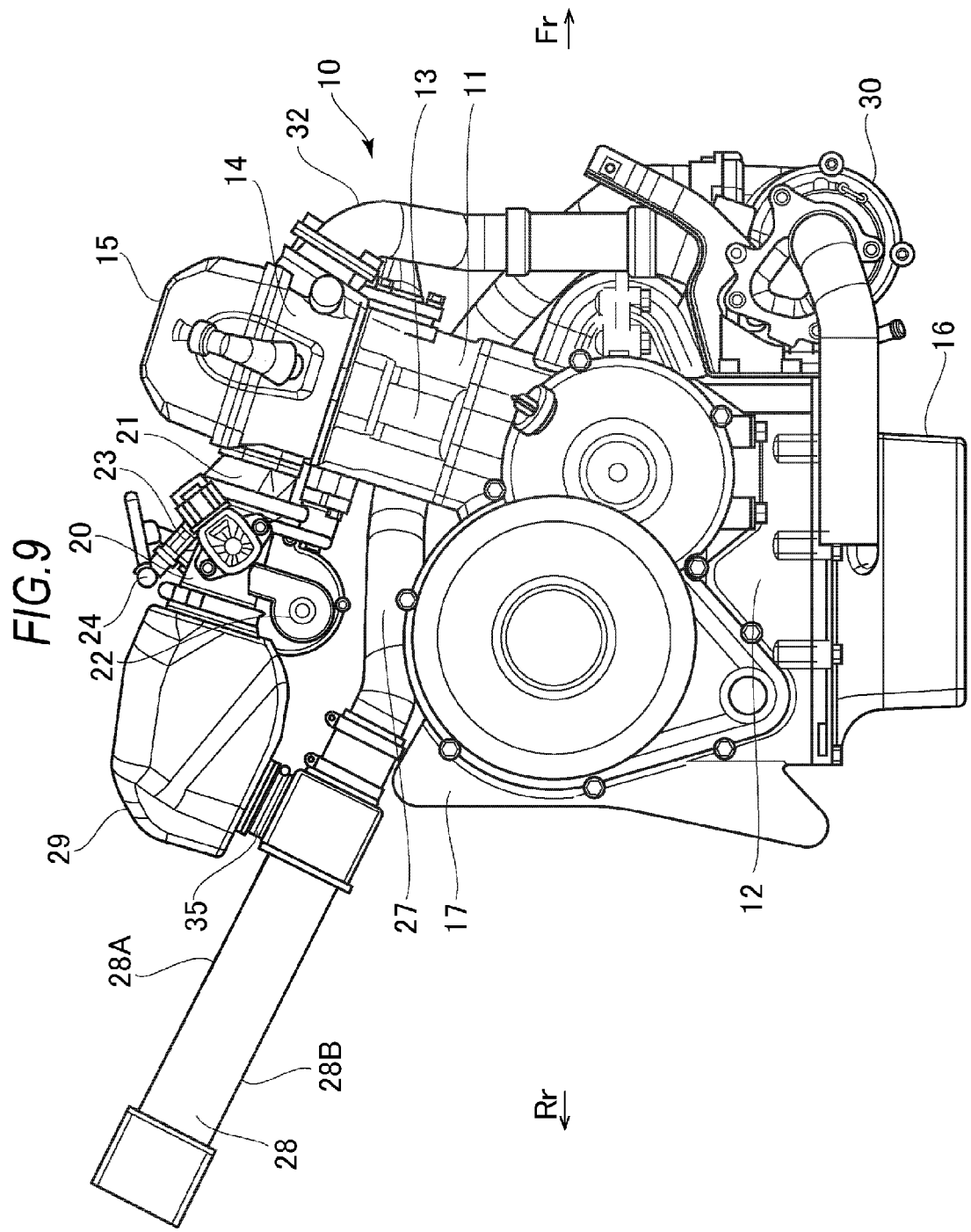
FIG. 9 is a right side view of the engine including the periphery of the intake system of the first embodiment.
Figure 10:
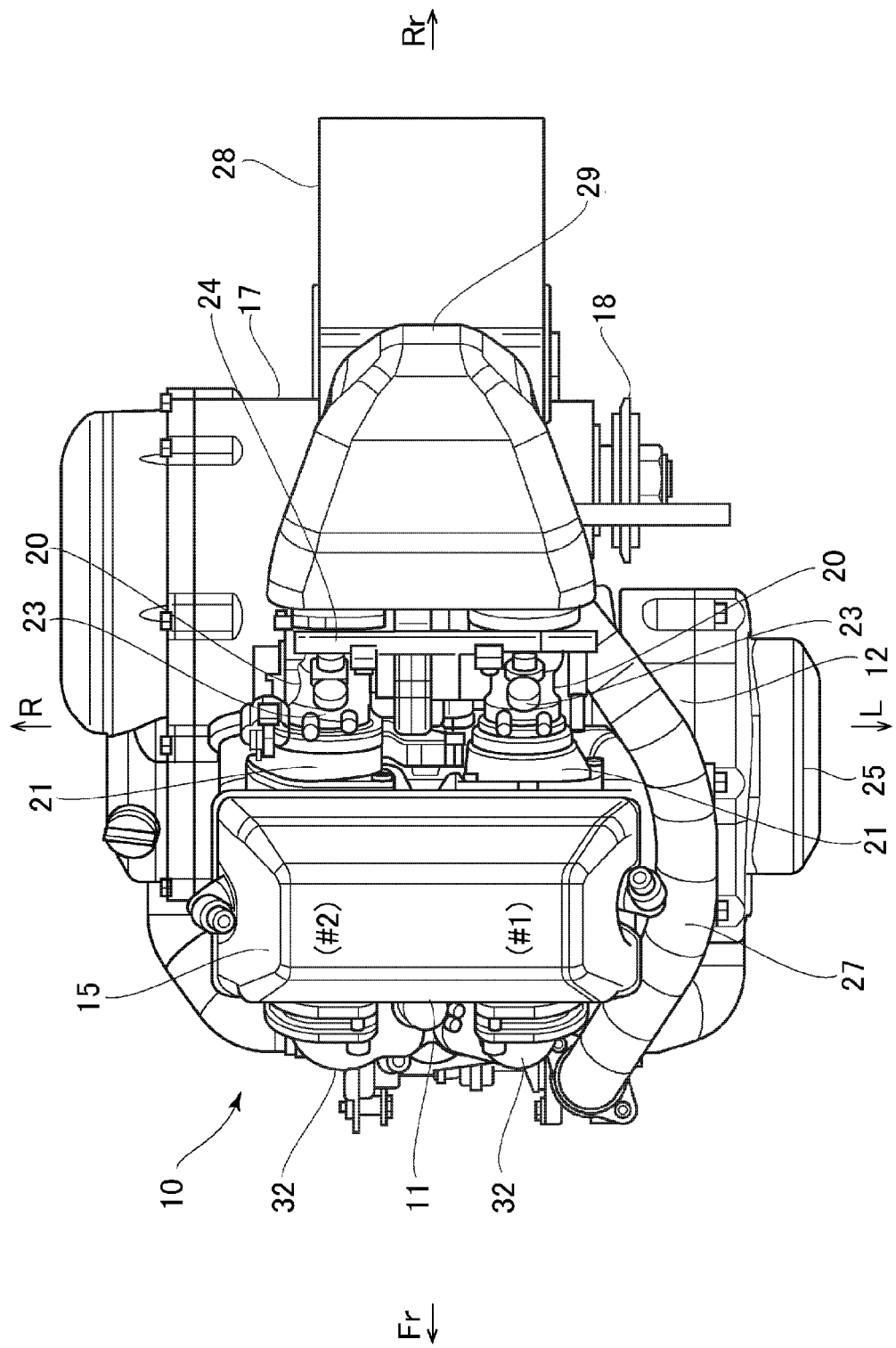
FIG. 10 is a top view of the engine including the periphery of the intake system of the first embodiment.

FIG. 8, FIG. 9, and FIG. 10 are a left side view, a right side view, and a top view, respectively, of the engine 11 including the periphery of the intake system. As illustrated from FIG. 8 to FIG. 10, the intercooler 28, exhibiting a thin box shape, is disposed by being inclined so that a front side thereof is moderately lowered, and is disposed in a manner that a longitudinal direction thereof extends in a front-and-rear direction of the vehicle body. To a front end surface of the box shape of the intercooler 28, the air feed pipe 27 is connected from the front direction. Here, as illustrated in FIG. 1, the intercooler 28 is disposed below the seat 108, and at least a part thereof (a vicinity of a rear portion) is positioned behind a front end of the seat 108, in a plan view of the vehicle body.

Further, an upper surface of the box shape of the intercooler 28 is set to a wind-receiving surface 28A, and a lower surface of the box shape of the intercooler 28 is set to a heat-radiating surface 28B. By inclining the intercooler 28 to make the wind-receiving surface 28A to be directed diagonally forward, it is designed such that, when compared to a case where the intercooler 28 is horizontally disposed without being inclined, a bending on a path from an introduction to a discharge of cooling air can be reduced, it is easy to receive a traveling air taken from a part in front of the vehicle body, and further, an exhaust hot air after passing through the intercooler 28 easily flows to the rear direction. Further, the heat-radiating surface 28B side of the lower surface of the intercooler 28 is disposed so as to face a space above the rear wheel 111, as illustrated in FIG. 1 and FIG. 3.

Figure 11:
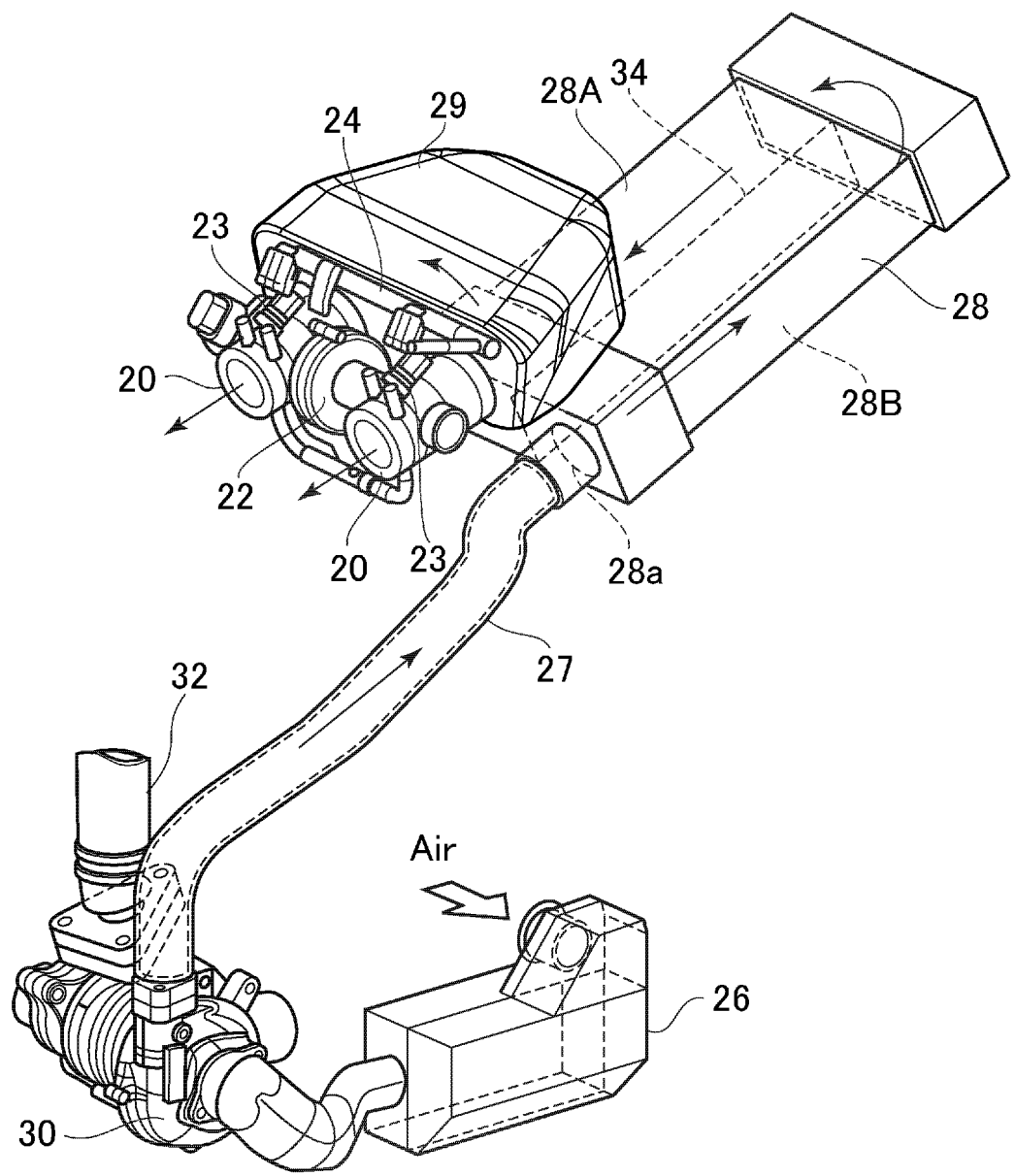
FIG. 11 is a view schematically illustrating a flow path of intake air in the intake system of the first embodiment.
Figure 12:
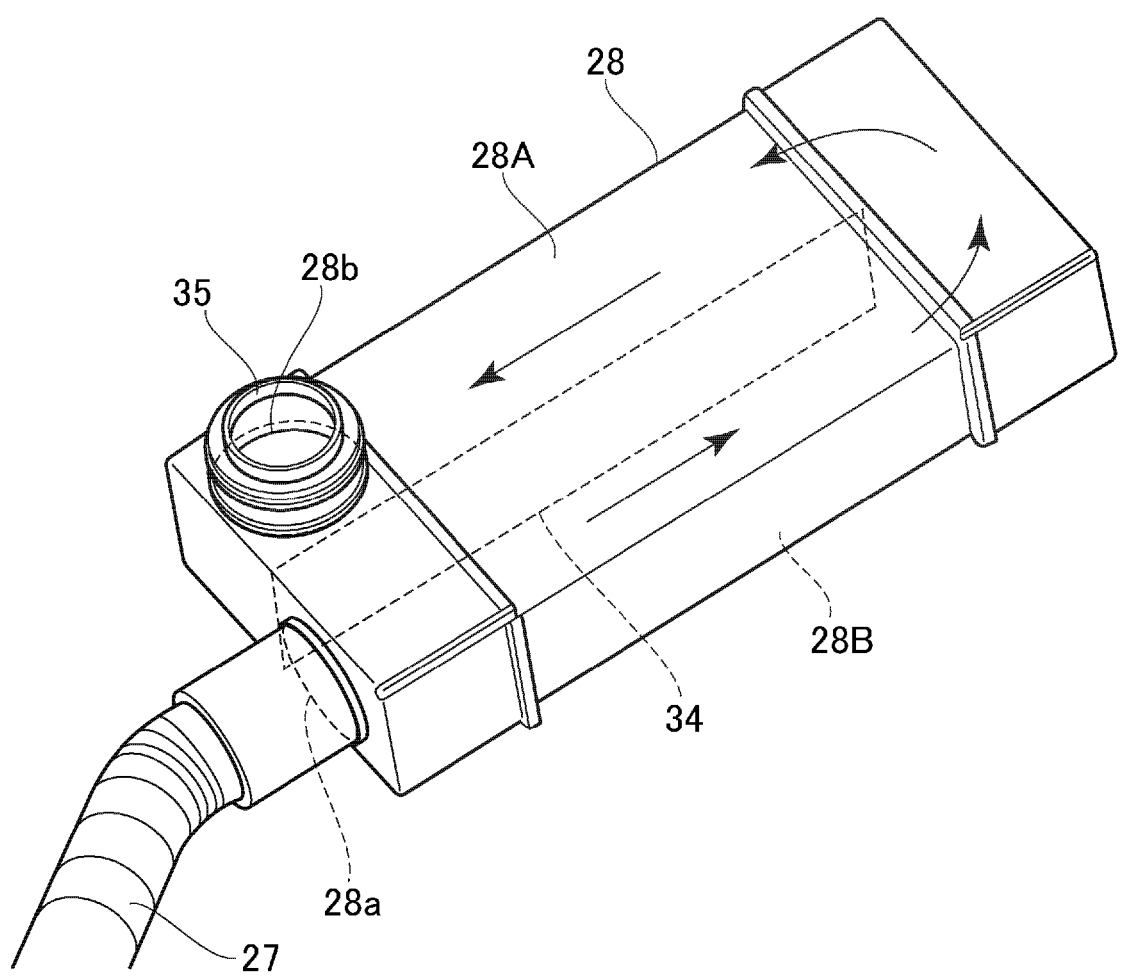
FIG. 12 is a perspective view illustrating an intercooler of the first embodiment.

FIG. 11 is a schematic view illustrating a flow path of air in the intake system. As described above, the air feed pipe 27 connected to the front end surface of the intercooler 28 is communicated with the inside of the intercooler 28, namely, an inlet port 28a of air is disposed on the front portion side of the intercooler 28. At a center of the inside of the intercooler 28, a partition plate 34 is provided along a longitudinal direction. The partition plate 34 does not reach a rear end of the intercooler 28, so that an internal air flow path of the intercooler 28 is formed in a substantially U-shape. In the present embodiment, there is formed a flow path through which the air flows from the front direction to the rear direction on the left side of the intercooler 28, turns back at the rear end portion of the intercooler 28, and flows from the rear direction to the front direction on the right side of the intercooler 28. Further, to the upper surface of the front end portion of the box shape of the intercooler 28, an outlet pipe 35 is connected, as illustrated in FIG. 12 and the like. Specifically, an outlet port 28b of air is disposed on the front portion side of the intercooler 28. As above, the inlet port 28a and the outlet port 28b of air are set on one side of the intercooler 28.

The surge tank 29 is disposed behind the cylinder head 14, as described above, and is connected to the outlet pipe 35 at a lower surface on a rear end side thereof (refer to FIG. 8, FIG. 9 and the like). Further, as illustrated in FIG. 10 and the like, the surge tank 29 exhibits a schematic triangular shape by enlarging a width thereof toward the throttle bodies 20 of the #1 and #2 cylinders, and is connected to the throttle bodies 20 at a front end surface thereof. In this case, a part (a vicinity of a front portion) of the intercooler 28 is disposed so as to overlap with the surge tank 29 in the up-and-down direction, as illustrated in FIG. 8, FIG. 9, or the like.

Next, main operations and the like regarding the disposition of the intake system described above will be described. First, by disposing the intercooler 28 adjacent to the surge tank 29, an air path between the intercooler 28 and the surge tank 29 can be shortened, resulting in that a throttle response is improved. Further, it is possible to decrease the number of pipes, which leads to a weight reduction and a reduction of the number of parts. Further, by disposing the intercooler 28 at a position behind the engine 11, it is possible to facilitate the layout in an area on a front side of the engine 11 where the radiator 33, the exhaust pipes 32, and the supercharger 30 (mainly in the case of the turbo) are disposed.

Further, by disposing the supercharger 30 at a position in front of the intercooler 28, the supercharger 30 is disposed in the vicinity of the engine 11, which means that the intake system parts can be concentrated, resulting in that the pipes can be shortened and simplified. Further, since the weight of the parts concentrates on the vehicle body center portion, operability of the vehicle improves. The supercharger 30 being a so-called turbo which compresses the intake air by utilizing the exhaust stream needs to be disposed in front of the engine 11 by being adjacent to the exhaust pipe 32 extending from the front side of the cylinders 13, but, the disposition of the intercooler 28 at the rear position facilitates the layout in the area in front of the engine 11.

Further, in the intercooler 28, the inlet port 28a and the outlet port 28b of air are positioned on one side (front half portion of the vehicle body), and the internal air flow path has a shape of substantially U-shape. Accordingly, the air flow path is configured to be turned back in the inside of the intercooler 28, and when compared to a case where a turned-back U-shaped pipe is provided, it is possible to set the area of the intercooler 28 wider by an occupation area of the conventional U-shaped pipe. Consequently, a limited room or space on a lower side of the seat 108 can be used to the full, which improves a cooling efficiency of the intake air, and besides, which enables a reduction of the number of parts.

Further, the intercooler 28 is positioned below the seat 108, and at least a part thereof is positioned behind the front end of the seat 108 in a plan view of the vehicle body. Accordingly, by disposing the intercooler 28 generating a high-temperature exhaust hot air, at a position below (directly below or behind) the seat 108, the exhaust hot air does not easily hit against a passenger when compared to a case where the intercooler 28 is disposed in front of the seat 108, which improves comfortability of the passenger.

Further, the intercooler 28 is disposed in a manner that the heat-radiating surface 28B being one side of the intercooler 28 faces the space above the rear wheel 111 (and below the seat 108). Accordingly, by disposing the intercooler 28 so as to be exposed to the space below the seat 108 at the rear portion of the vehicle body, the heat-radiating surface 28B is exposed to the outside air to make it easy to cool the air, and further, the exhaust hot air easily flows, which provides an excellent heat radiation property.

Further, a part of the intercooler 28 is overlapped with the surge tank 29 in the up-and-down direction, and accordingly, by disposing the components in a concentrated manner, it is possible to further shorten the air feed pipe 27 from the supercharger 30. In this case, since the weight of the components concentrates on the vehicle body center portion, operability of the vehicle improves.

Further, the intercooler 28 is disposed in a manner that the longitudinal direction thereof extends in the front-and-rear direction of the vehicle body. Accordingly, by disposing the intercooler 28 to make a flow path of air to be substantially straight with respect to the air feed pipe 27 extending in the front-and-rear direction from the supercharger 30 positioned in front of the intercooler 28, a resistance part with respect to the flow of air is reduced, which provides an excellent throttle response. Further, in the motorcycle 100 and the like extended in the front-and-rear direction to have a long and narrow shape, by extending the intercooler 28 in the front-and-rear direction, it is possible to secure a length of passage path with a minimum turning of the path, resulting in that an excellent cooling efficiency is provided.

The supercharger 30 is positioned on a front lower portion of the engine 11 (crankcase 12), and the air cleaner 26 is positioned on a side lower portion of the engine 11 (crankcase 12). By making the supercharger 30 and the air cleaner 26 to be positioned in proximity to each other as above, it is possible to shorten the pipe.

Further, the intercooler 28 may also be one of water-cooling type.

Further, the motorcycle 100 may have a duct by which a traveling air is led from a front portion of the vehicle body to a front side surface of the intercooler 28.

Further, in a case of a vehicle having a cover attached thereto, an air-exhaust port may be provided to a seat cover at a rear portion of the vehicle body (below the seat 108), and an air-exhaust duct passing through the cover and connecting a rear side surface of the intercooler 28 and the air-exhaust port may be provided.

Further, the rear side surface of the intercooler 28 may also be directly exposed to the outside of the vehicle body.

Further, the air-exhaust port of the seat cover may also be positioned at a rear end of the vehicle body, and further, it may also be provided by being directed upward of the vehicle body if it is positioned at the rear of the seat 108.

(Second Embodiment)

Figure 13:
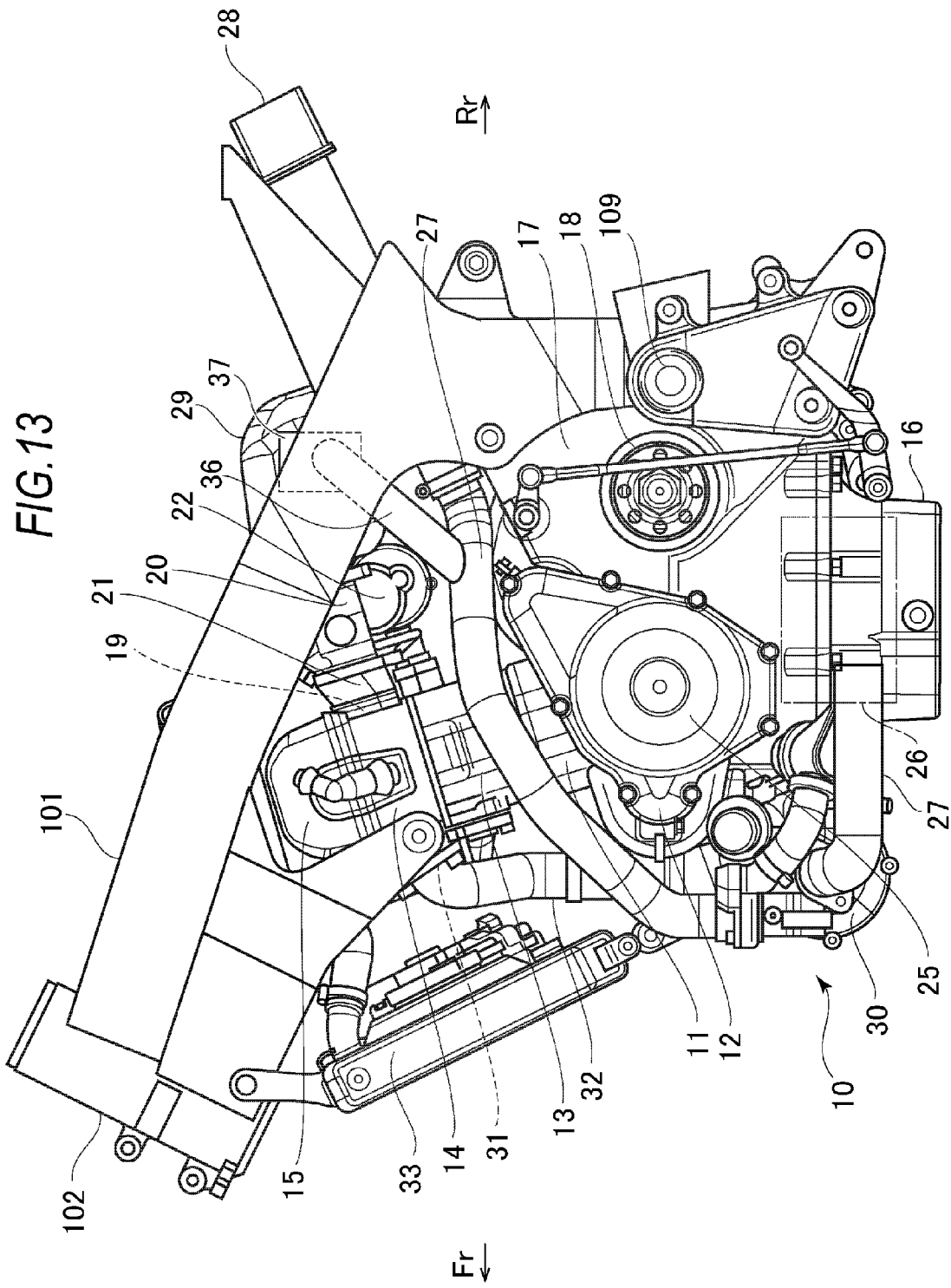
FIG. 13 is a side view of a periphery of an engine unit of a second embodiment.
Figure 14:
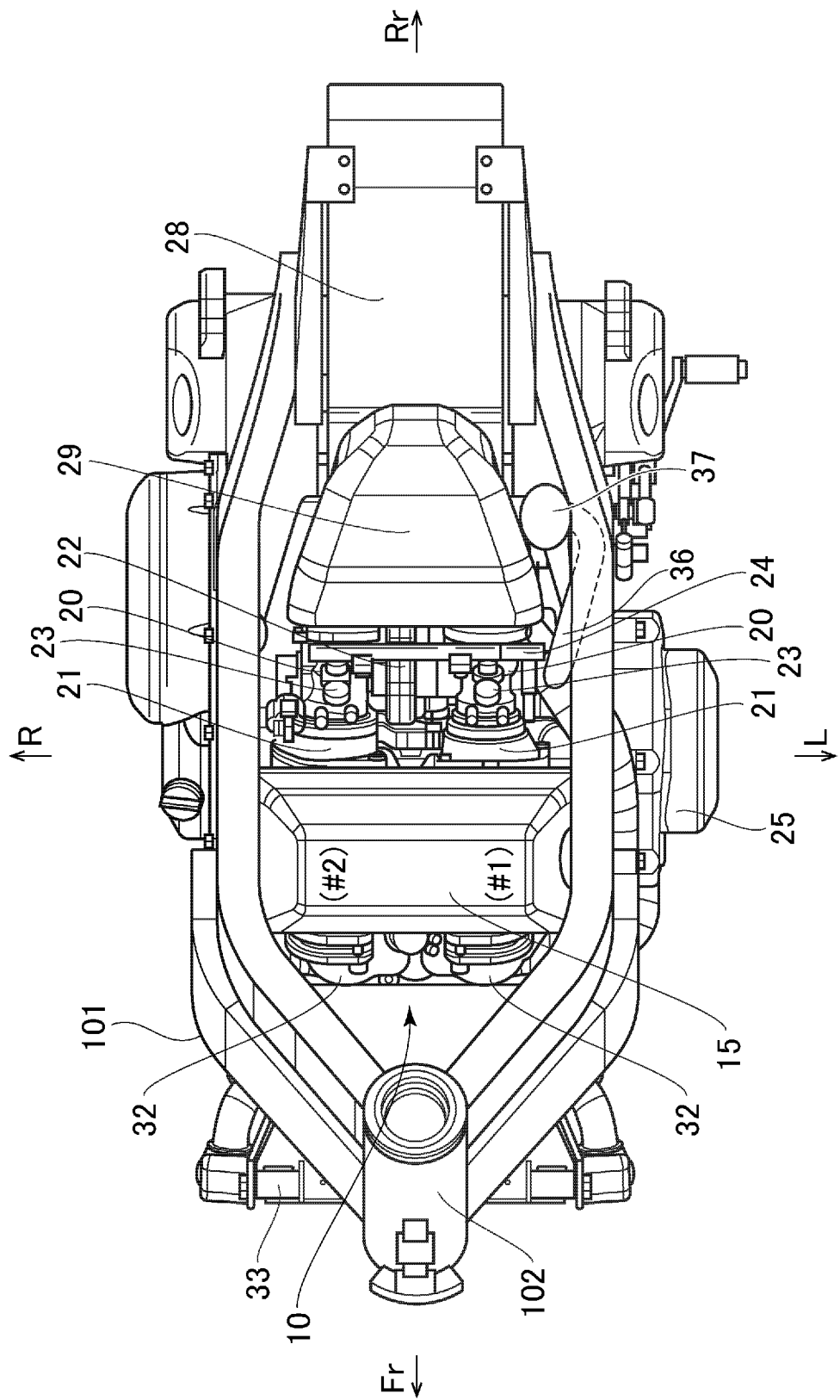
FIG. 14 is a top view of the periphery of the engine unit of the second embodiment.
Figure 15:
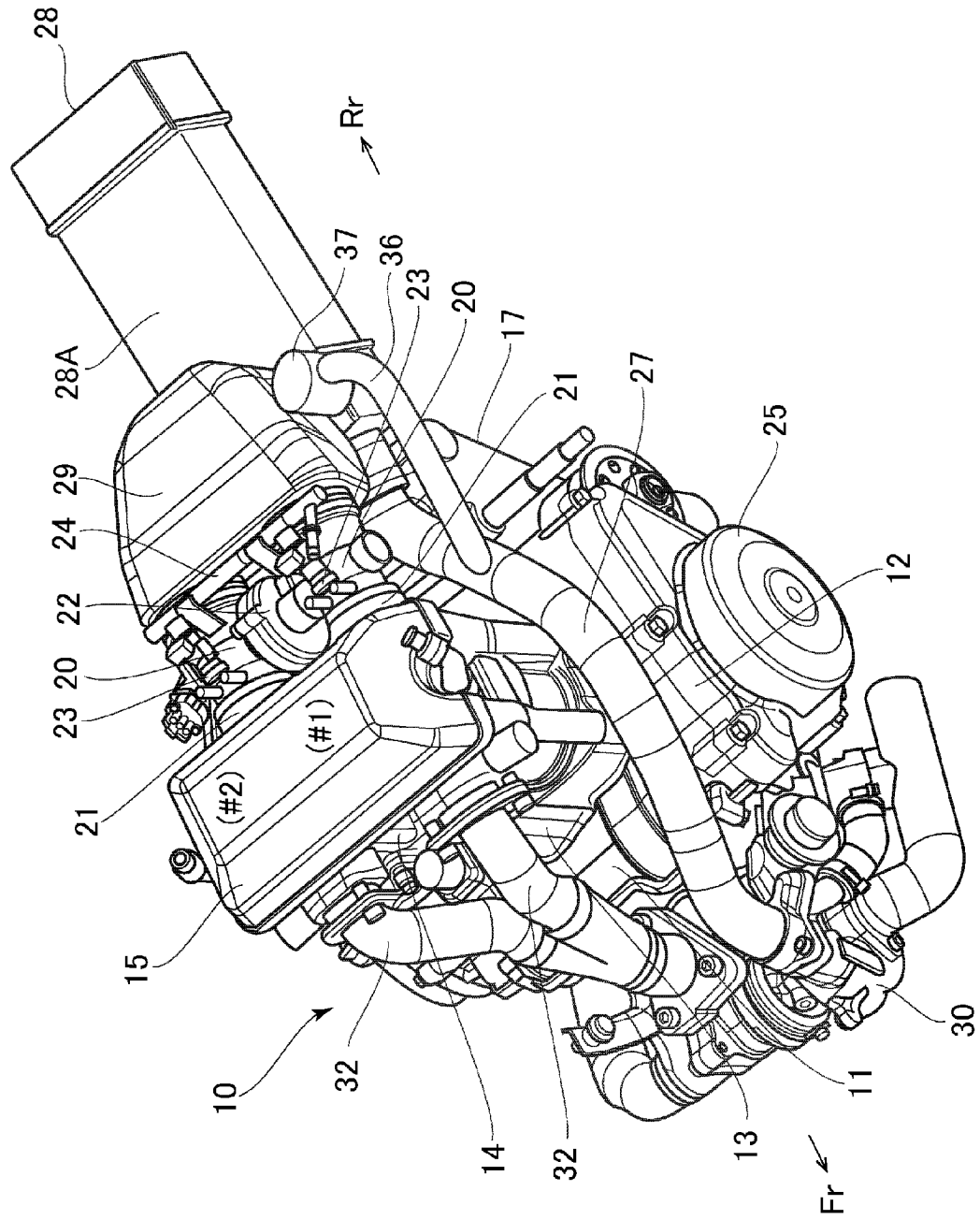
FIG. 15 is a perspective view of a periphery of an intake system of the engine unit of the second embodiment.
Figure 16:
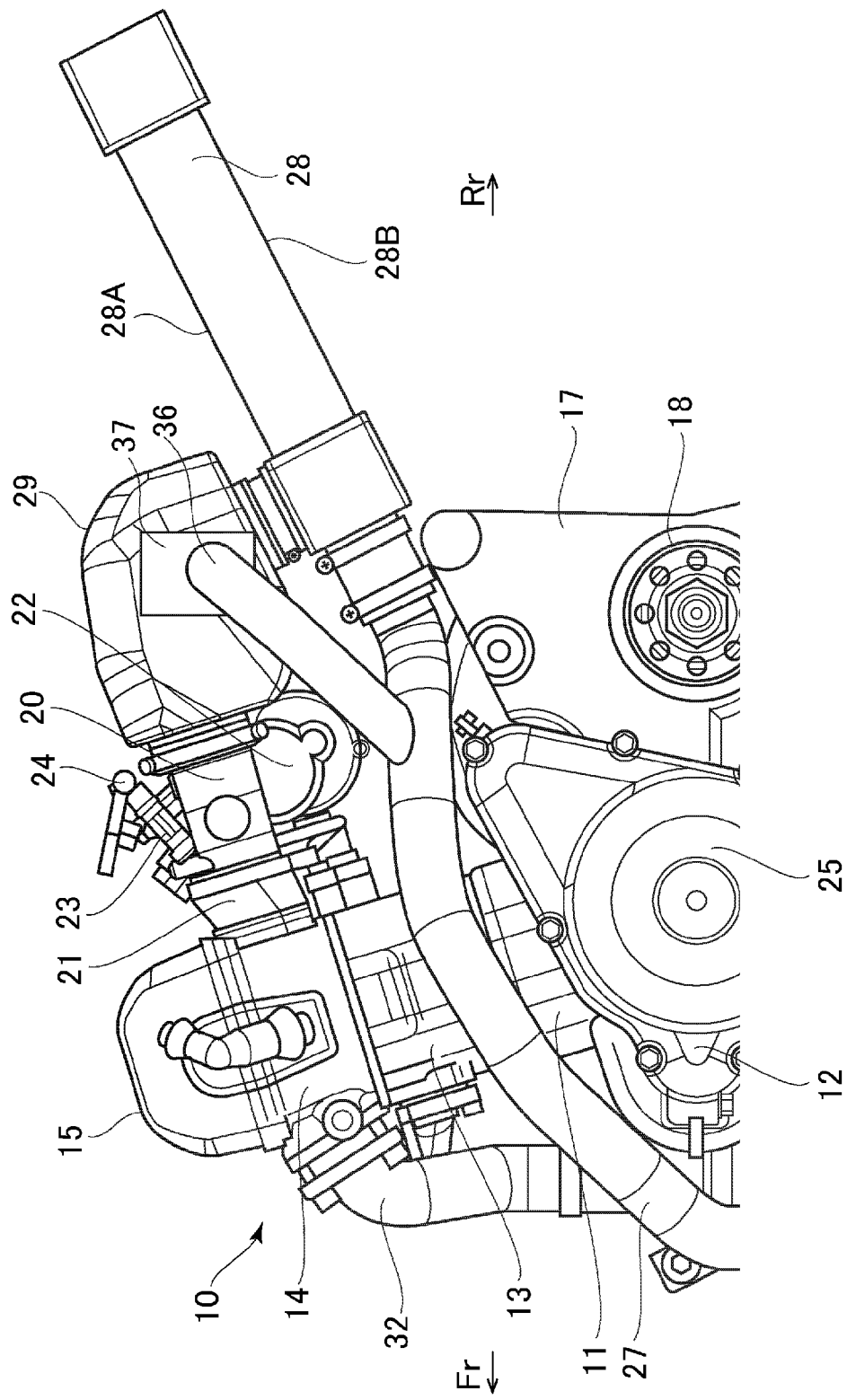
FIG. 16 is a left side view of an engine including the periphery of the intake system of the second embodiment.
Figure 17:
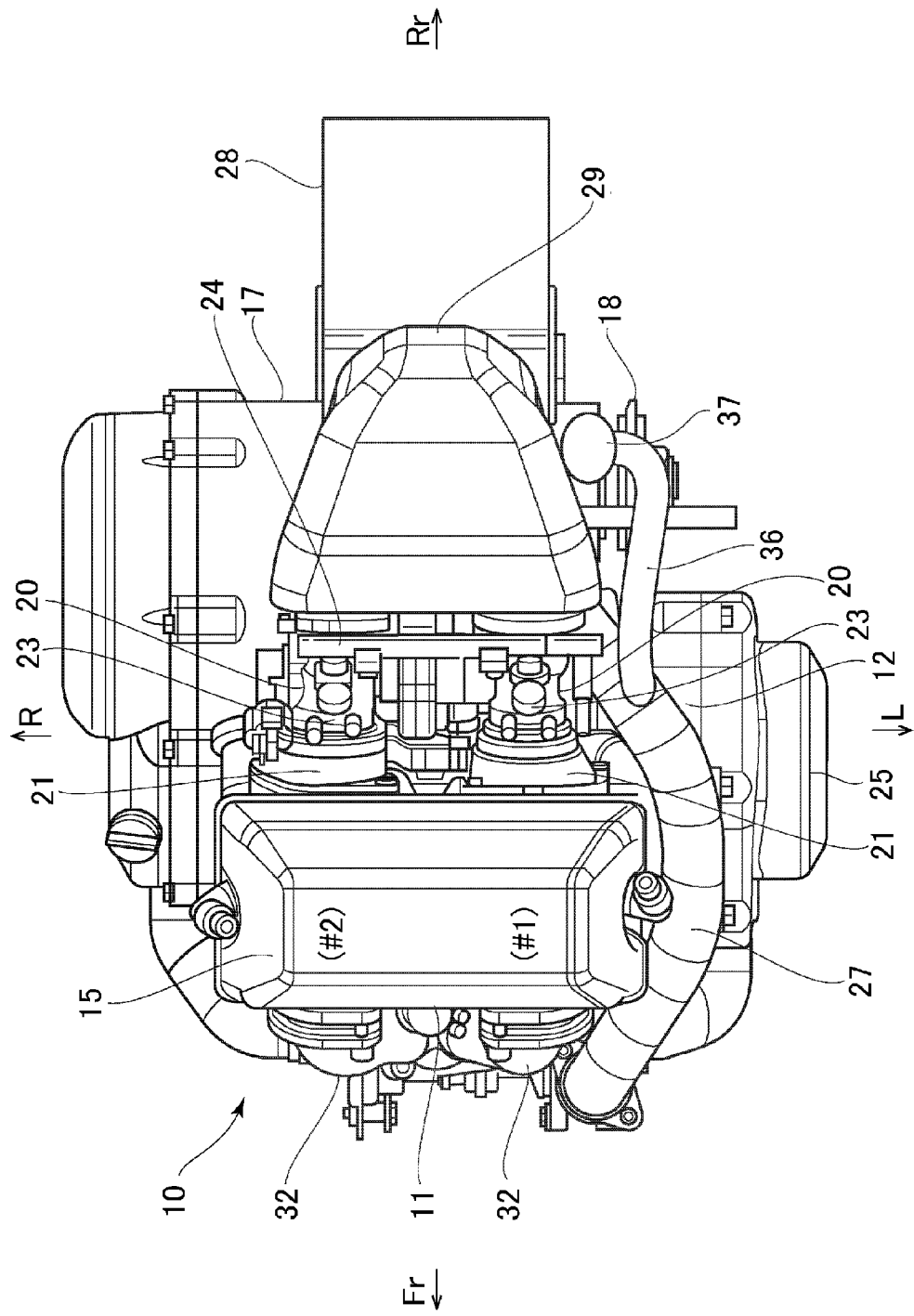
FIG. 17 is a top view of the engine including the periphery of the intake system of the second embodiment.
Figure 18:
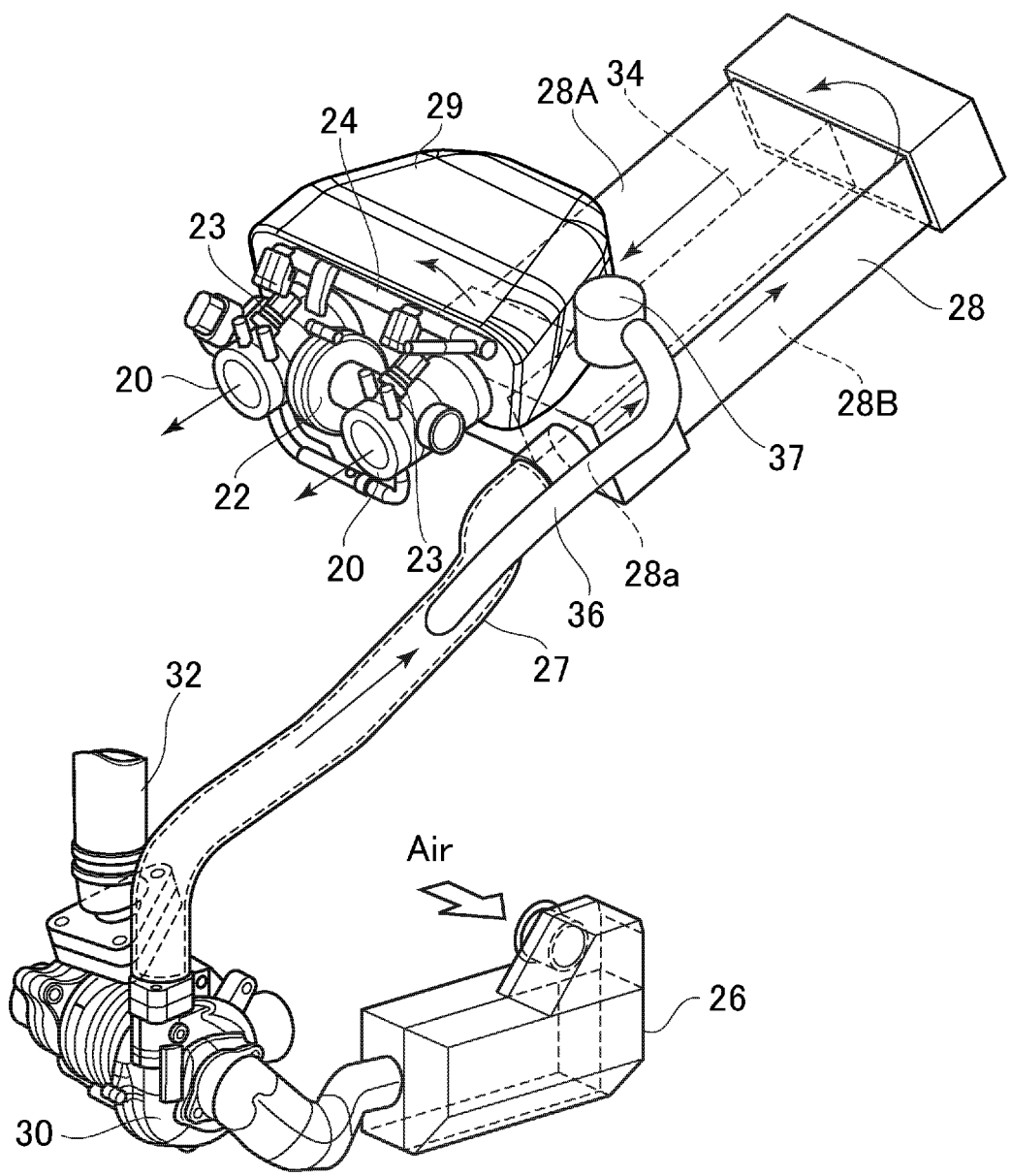
FIG. 18 is a view schematically illustrating a flow path of intake air in the intake system of the second embodiment.
Figure 19:
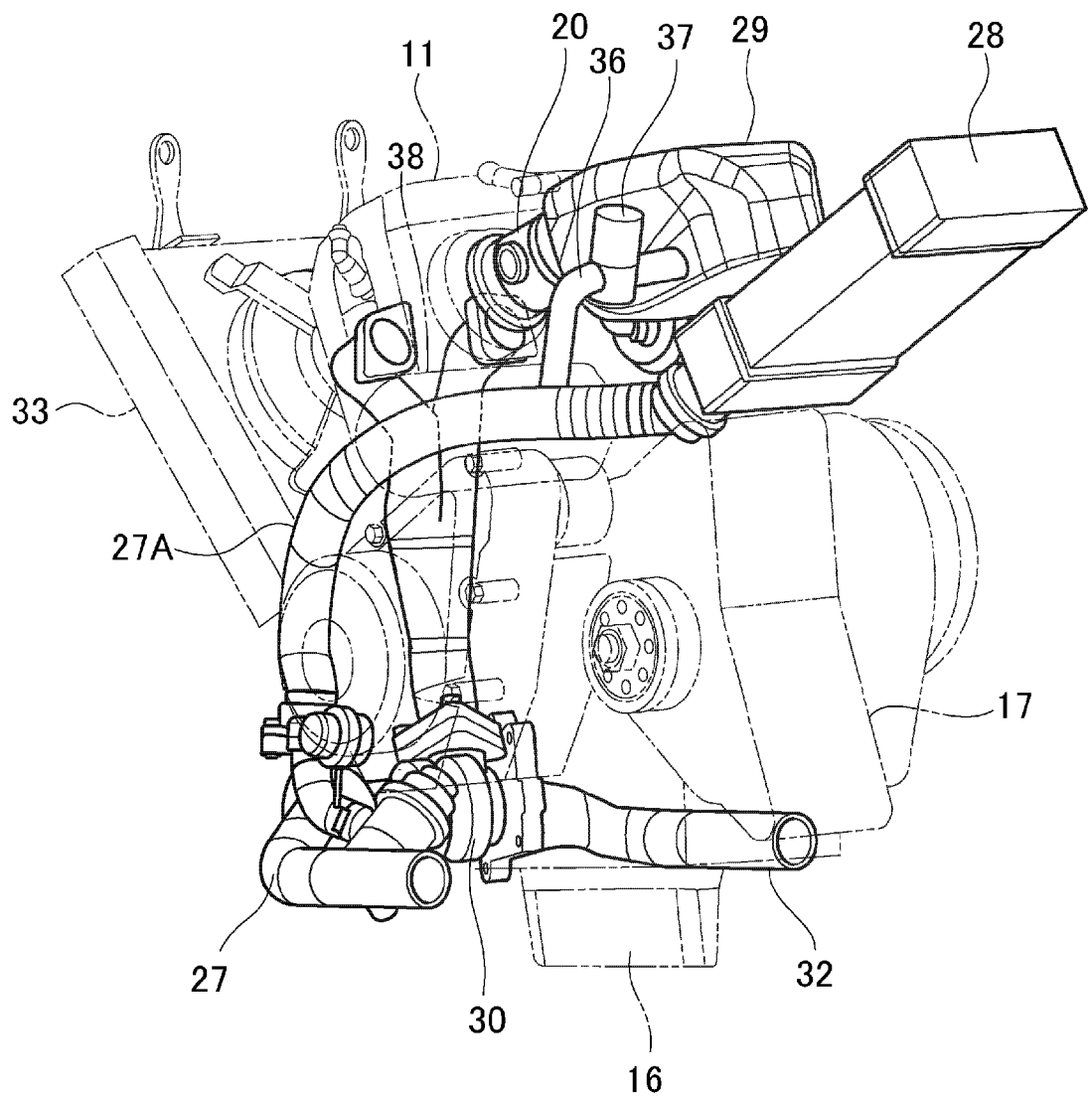
FIG. 19 is a perspective view illustrating a main configuration of a supercharging system of the second embodiment.
Figure 20:
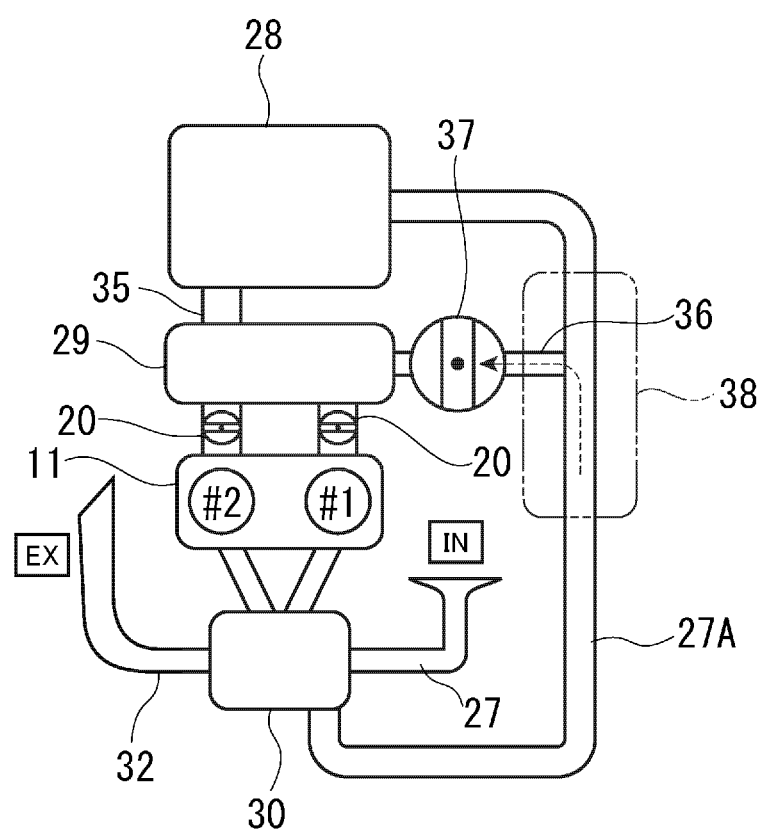
FIG. 20 is a schematic view illustrating the main configuration of the supercharging system of the second embodiment.

Next, a motorcycle of a second embodiment will be described. A supercharging system of an internal combustion engine of the present embodiment is different from that of the first embodiment. Hereinafter, the supercharging system of the present embodiment will be described with reference to FIG. 13 to FIG. 20. FIG. 13 is a side view of a periphery of an engine unit. FIG. 14 is a top view of the periphery of the engine unit. FIG. 15 is a perspective view of a periphery of an intake system of the engine unit. FIG. 16 is a left side view of an engine including the periphery of the intake system. FIG. 17 is a top view of the engine including the periphery of the intake system. FIG. 18 is a view schematically illustrating a flow path of intake air in the intake system. FIG. 19 is a perspective view illustrating a main configuration of the supercharging system. FIG. 20 is a schematic view illustrating the main configuration of the supercharging system. Note that the configuration same as that of the first embodiment is denoted by the same reference numeral, and explanation thereof will be omitted.

As illustrated in FIG. 19, the supercharging system of the present embodiment has a bypass pipe 36 whose one end is connected to an intermediate portion of a coupling pipe 27A (which is a part of the air feed pipe 27) connecting the supercharger 30 and the intercooler 28, and whose other end is connected to the surge tank 29. More concretely, the other end of the bypass pipe 36 is connected to a side (left side) of the surge tank 29. Further, at an intermediate portion of the bypass pipe 36, a control valve 37 controlling opening/closing of the bypass pipe 36 is provided. In this case, it is also possible to design such that the other end of the bypass pipe 36 is connected to an intermediate portion of the outlet pipe 35 (refer to FIG. 12) connecting the intercooler 28 and the surge tank 29.

When a rapid acceleration of the engine 11 occurs, there is a need to suck a large amount of air, and if no measure is taken, the intercooler 28 itself becomes an air-flow resistance, resulting in that a pressure in the surge tank 29 is lowered. Therefore, in such a case, the supercharging system of the present embodiment performs control to open the bypass pipe 36 by operating the control valve 37. Note that it is possible to perform operation control to open the control valve 37 in accordance with a slow/fast speed of throttle operation, namely, when a throttle opening speed becomes a predetermined speed or greater, based on a signal of a throttle opening degree sensor and the like. Alternatively, by opening the control valve 37 in accordance with an internal pressure of the surge tank 29, namely, when the internal pressure becomes a predetermined internal pressure or less, an air flows from the coupling pipe 27A into the surge tank 29 by passing through the bypass pipe 36, as indicated by a dotted line in FIG. 20. Thereafter, an operation control is performed to close the control valve 37 after a predetermined period of time passes, and the internal pressure of the surge tank 29 has the predetermined value again. The closing operation of the control valve 37 is conducted in accordance with an elapsed time from the opening operation, a measured value of the internal pressure of the surge tank 29 and the like, for example.

As above, in accordance with a state of auxiliary machines of the internal combustion engine, for example, in a situation where the air in the surge tank 29 is rapidly sucked in the engine 11 such as a situation where the rapid opening of throttles occurs, the intake air can be promptly supplied into the surge tank 29 without passing through the intercooler 28 having a relatively large air-flow resistance by opening the control valve 37, resulting in that a lack of intake air can be suppressed. Note that similar operation and effect can be achieved also when the other end of the bypass pipe 36 is connected to the outlet pipe 35.

Further, the supercharging system of the present embodiment is provided with a second surge tank 38, which is different from the surge tank 29 connected to the throttle bodies 20. The second surge tank 38 is provided on the coupling pipe 27A, as indicated by a two-dot chain line in FIG. 19 and FIG. 20. More concretely, the second surge tank 38 is disposed on a side of the cylinder 13 (on a left side of the #1 cylinder). In this case, one end of the bypass pipe 36 is connected to the second surge tank 38, and the bypass pipe 36 is opened/closed by the control valve 37, similar to the above description. Note that the second surge tank 38 is preferably disposed by being adjacent to the surge tank 29, and such a disposition makes it possible to supply the air more quickly.

The second surge tank 38 functions as a spare surge tank on the coupling pipe 27A. Specifically, it is possible to secure a volume of intake air which does not pass through the intercooler 28, by an amount of increase in accordance with a capacity of the second surge tank 38, at a time of bypassing the air with the use of the bypass pipe 36. By providing the second surge tank 38, it is possible not only to bypass the intercooler 28 via the bypass pipe 36, but also to effectively suppress the lack of intake air in the sort of main surge tank 29 when the rapid opening of throttles occurs.

Figure 21:
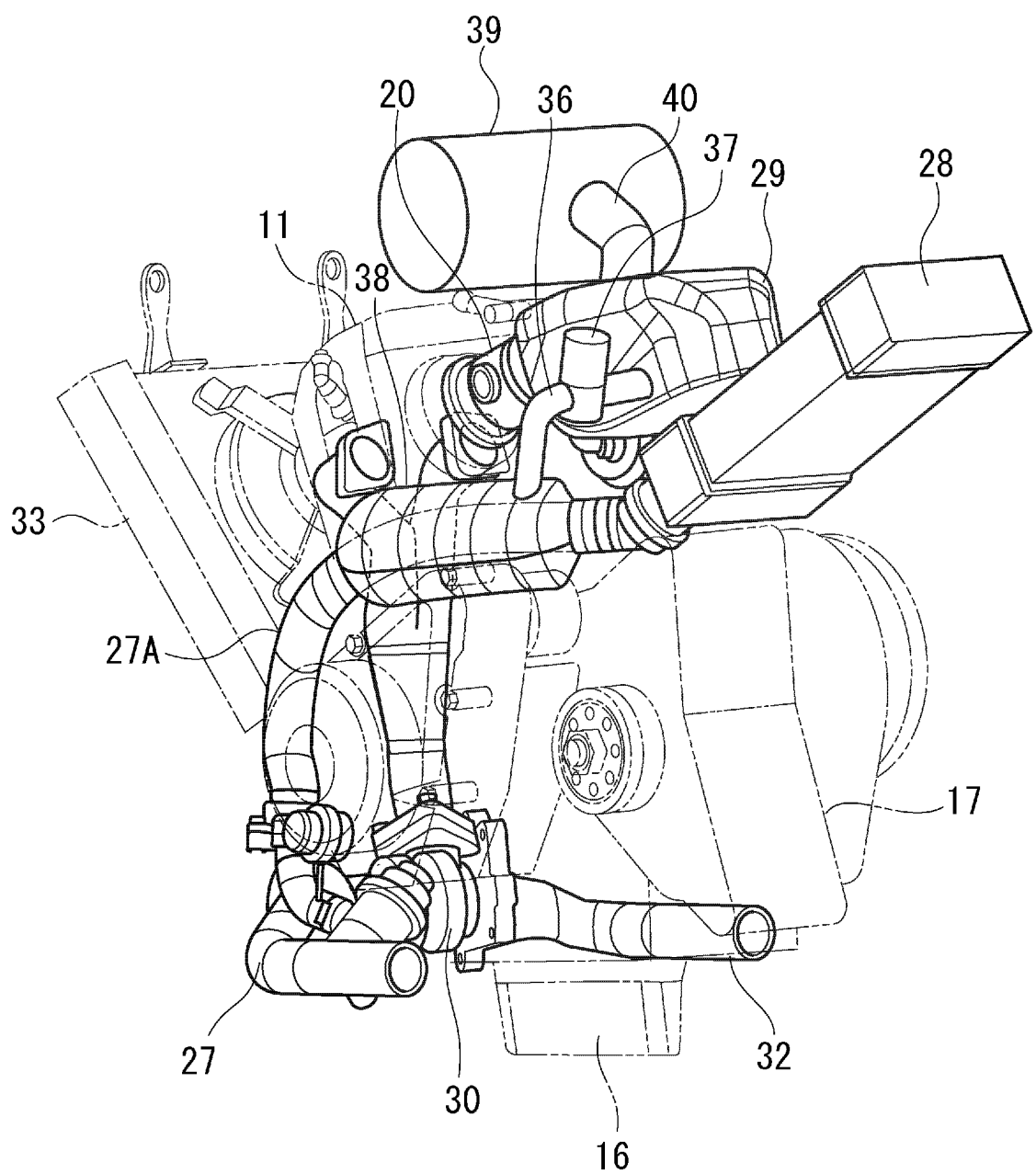
FIG. 21 is a perspective view illustrating a modified example of the supercharging system of the second embodiment.
Figure 22:
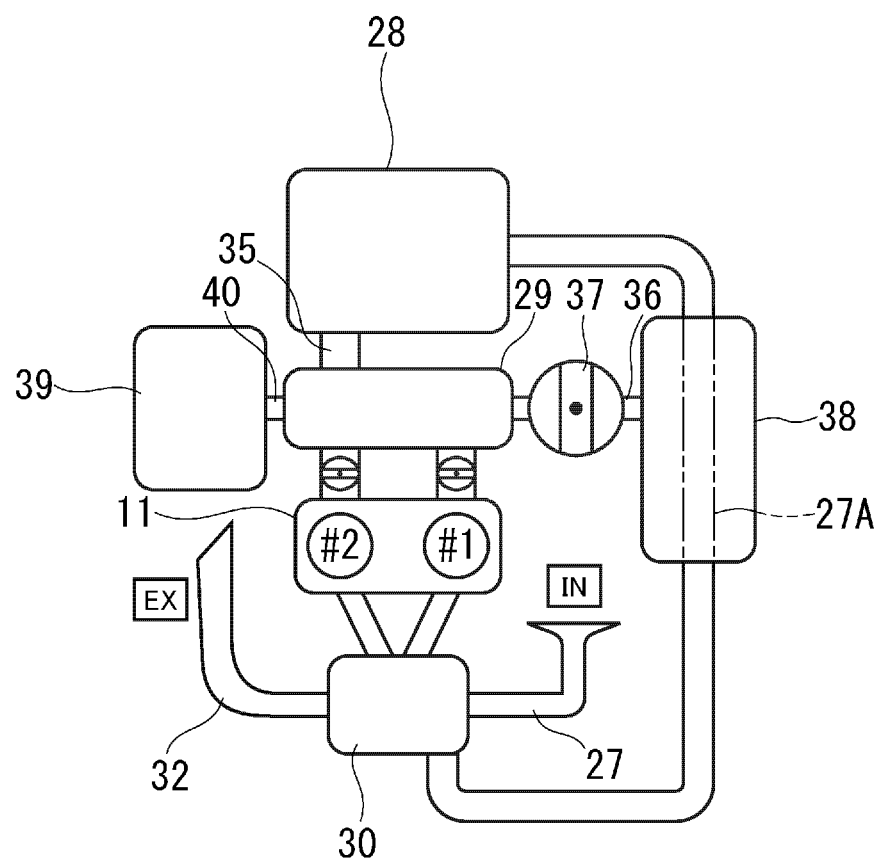
FIG. 22 is a schematic view illustrating the modified example of the supercharging system of the second embodiment.

Each of FIG. 21 and FIG. 22 illustrates a modified example of the supercharging system of the present embodiment. A third surge tank 39 directly connected to the surge tank 29 is provided, in particular, and both of the surge tanks are mutually coupled via a coupling pipe 40. More concretely, the third surge tank 39 is disposed above the surge tank 29, as illustrated in FIG. 21. Note that the basic configuration may be similar to that of FIG. 19, in which, for example, the bypass pipe 36 is opened/closed by the control valve 37, and the second surge tank 38 is provided on the coupling pipe 27A. Note that the bypass pipe 36 and the second surge tank 38 do not necessarily have to be used at the same time, namely, a form of using only the bypass pipe 36 can also be employed.

By providing the third surge tank 39 as in the modified example, it is possible to achieve an effect which is substantially equal to an effect provided by increasing a capacity of the surge tank 29. Specifically, the air can be efficiently supplied by the bypass pipe 36, and in addition to that, the lack of intake air in the surge tank 29 when the rapid opening of throttles occurs can be effectively suppressed.

Further, a further modified example of the supercharging system of the present embodiment is provided with an accumulator being an accumulating device, at a position in the middle of the intake system including a part from the above-described coupling pipe 27A to the surge tank 29, instead of either or both of the second surge tank 38 and the third surge tank 39. Although an illustration and the like of the accumulator will be omitted, a normal accumulator can be employed. Specifically, the accumulator has accumulated gas sealed by a rubber film or the like in a container thereof, and in a case of the present modified example, the intake air fed by the coupling pipe 27A is sealed in an accumulator casing to be once accumulated. Subsequently, when a pressure of the intake air on the outside of the accumulator casing is lowered, the intake air accumulated in the accumulator casing is pushed out to be discharged. As above, the accumulating device operates to maintain the pressure of gas in the above-described intake system, particularly, in the surge tank 29.

Concretely, the accumulator, instead of the second surge tank 38, is provided on the coupling pipe 27A, and the accumulator is made to cooperate with the bypass pipe 36. As above, by providing the accumulator capable of holding the intake air kept in a high-pressure state, on the coupling pipe 27A, it is possible to suppress a reduction of air pressure in the surge tank 29 when the rapid opening of throttles occurs, by accumulating a part of intake air in the accumulator during a normal traveling, and by discharging the air during the performance of bypass.

Further, it is also possible to provide another accumulator (second accumulating device) which is directly connected to the surge tank 29, instead of the third surge tank 39. Also in this case, by providing the accumulator as the second accumulating device, it is possible to achieve an effect which is substantially equal to an effect provided by increasing a capacity of the surge tank 29, and to effectively suppress the lack of intake air in the surge tank 29 when the rapid opening of throttles occurs.

According to the second embodiment, it is possible to promptly supply the intake air into the surge tank 29 by opening the control valve 37 in accordance with the state of auxiliary machines of the internal combustion engine including the case where the rapid opening of throttles occurs, and to suppress the lack of the intake air, resulting in that a mixed state of the fuel and the intake air can be set to a proper state. By applying the present invention to a vehicle such as a motorcycle, in particular, in which a throttle operation significantly exerts an effect on a vehicle body stability, it is possible to obtain an output characteristic closer to an intended output characteristic of a passenger, resulting in that operability, riding comfortability and the like of the vehicle are improved.

(Third Embodiment)

Figure 23:
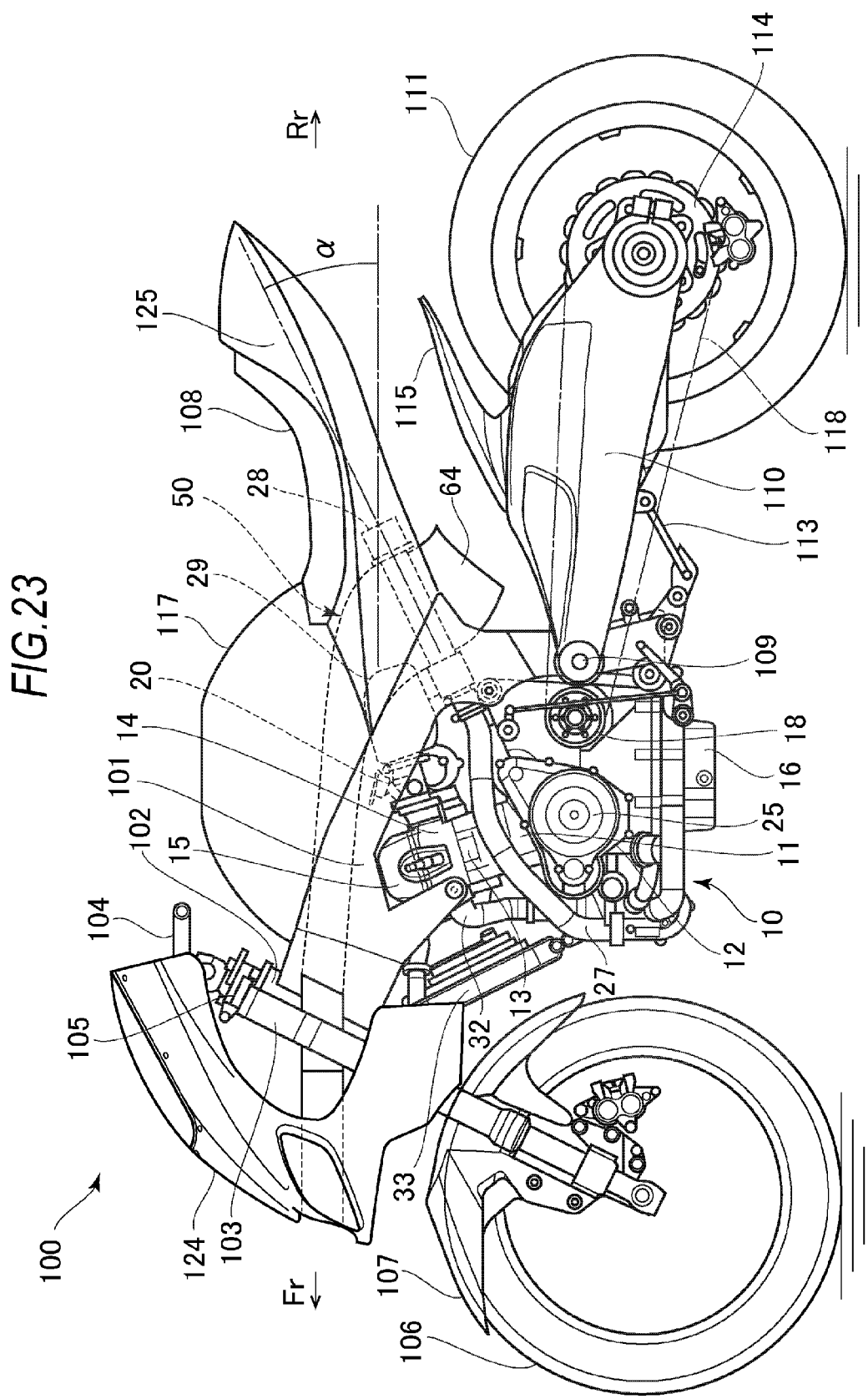
FIG. 23 is a side view of a motorcycle of a third embodiment.
Figure 24:
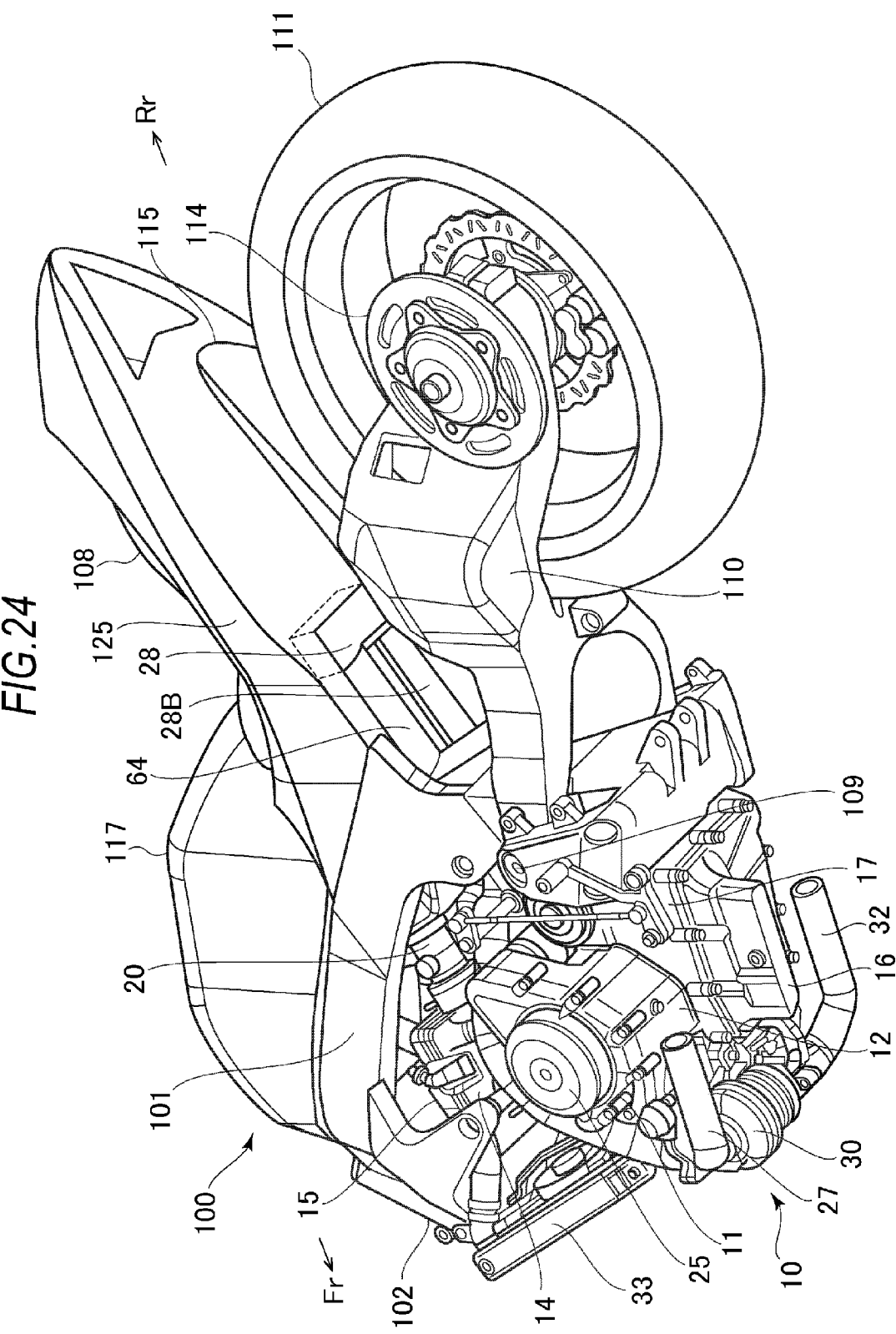
FIG. 24 is a perspective view of the motorcycle of the third embodiment when seen from the rear side.
Figure 25:
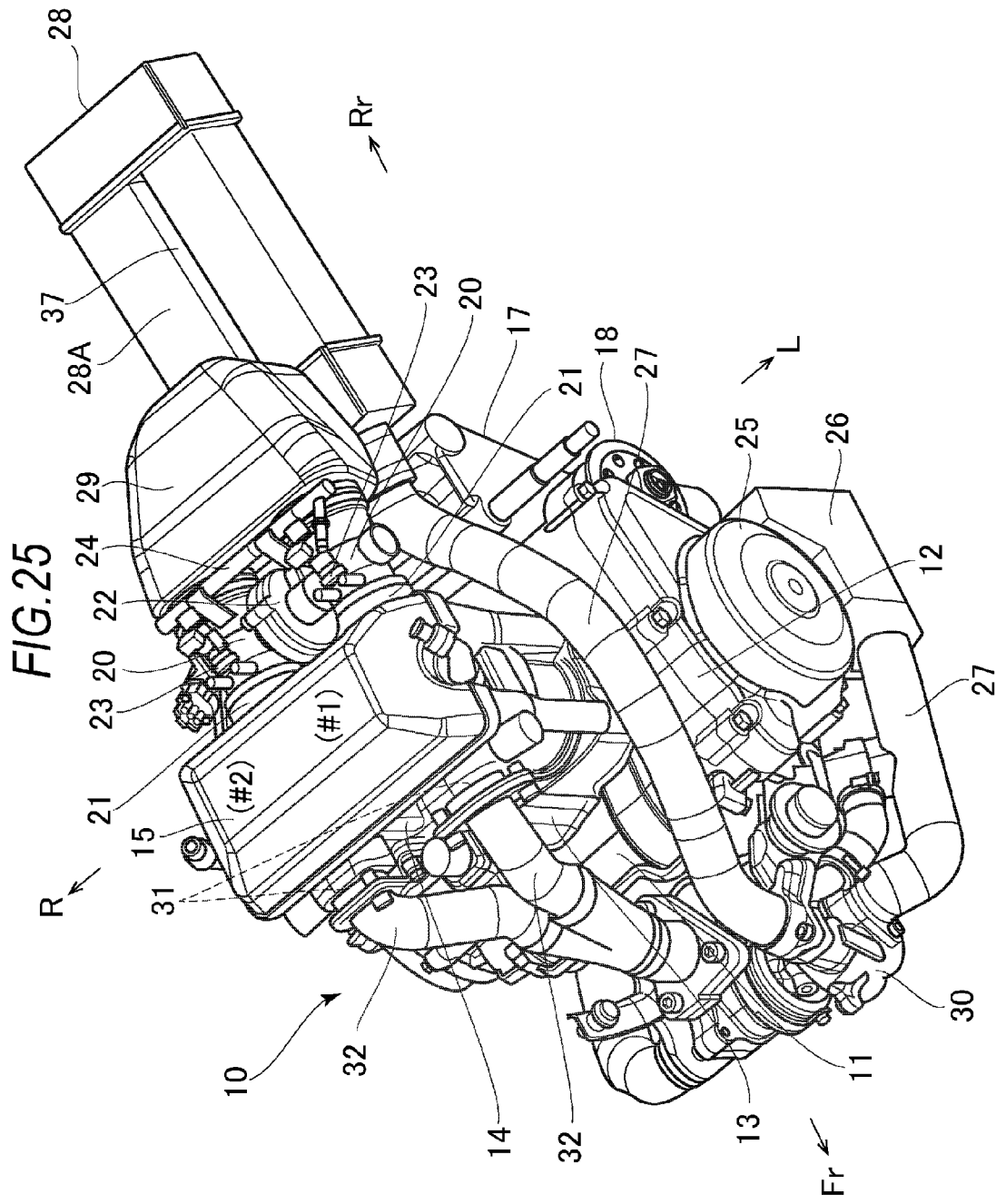
FIG. 25 is a perspective view of a periphery of an engine unit of the third embodiment.
Figure 26:
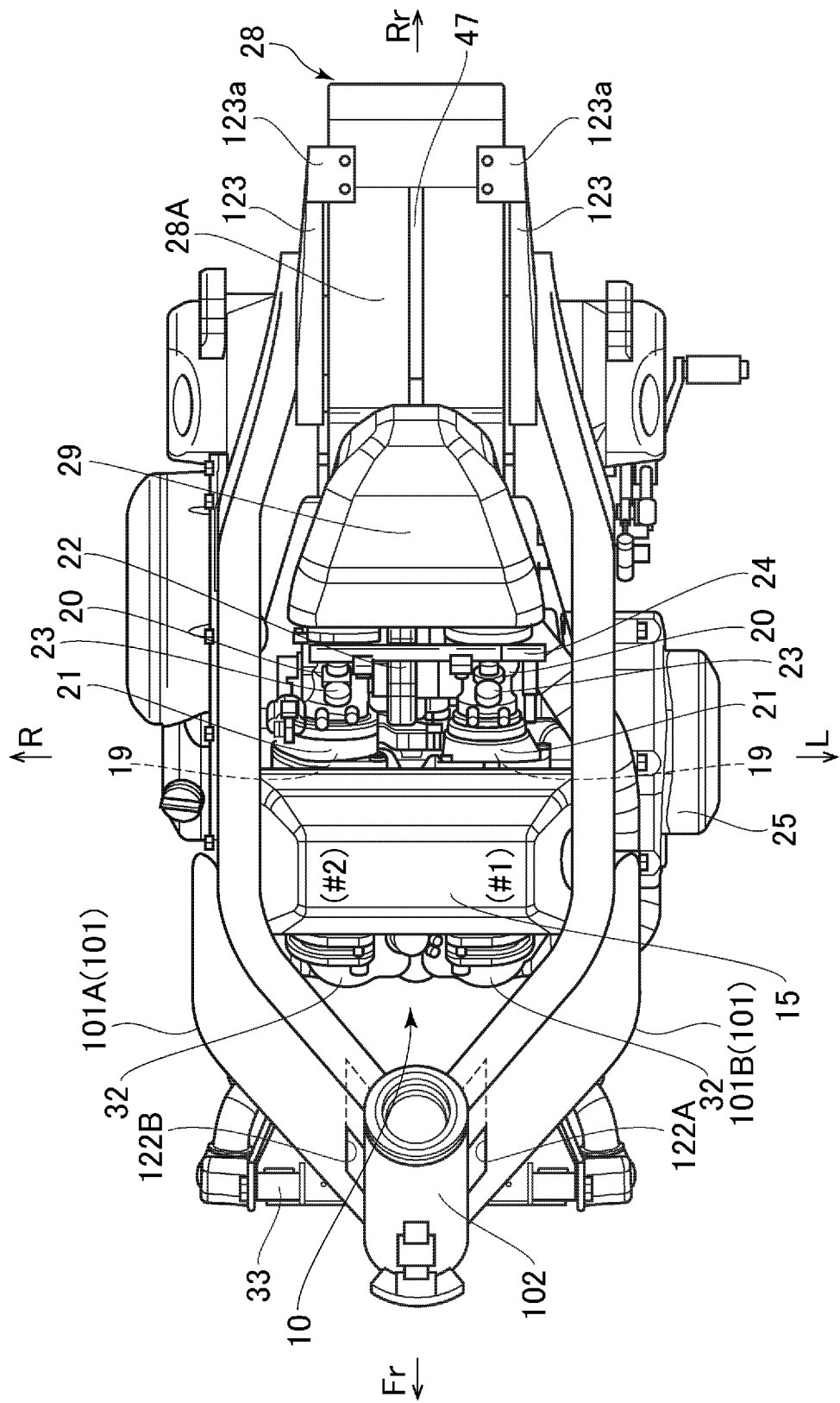
FIG. 26 is a top view of the engine unit of the third embodiment.
Figure 27:
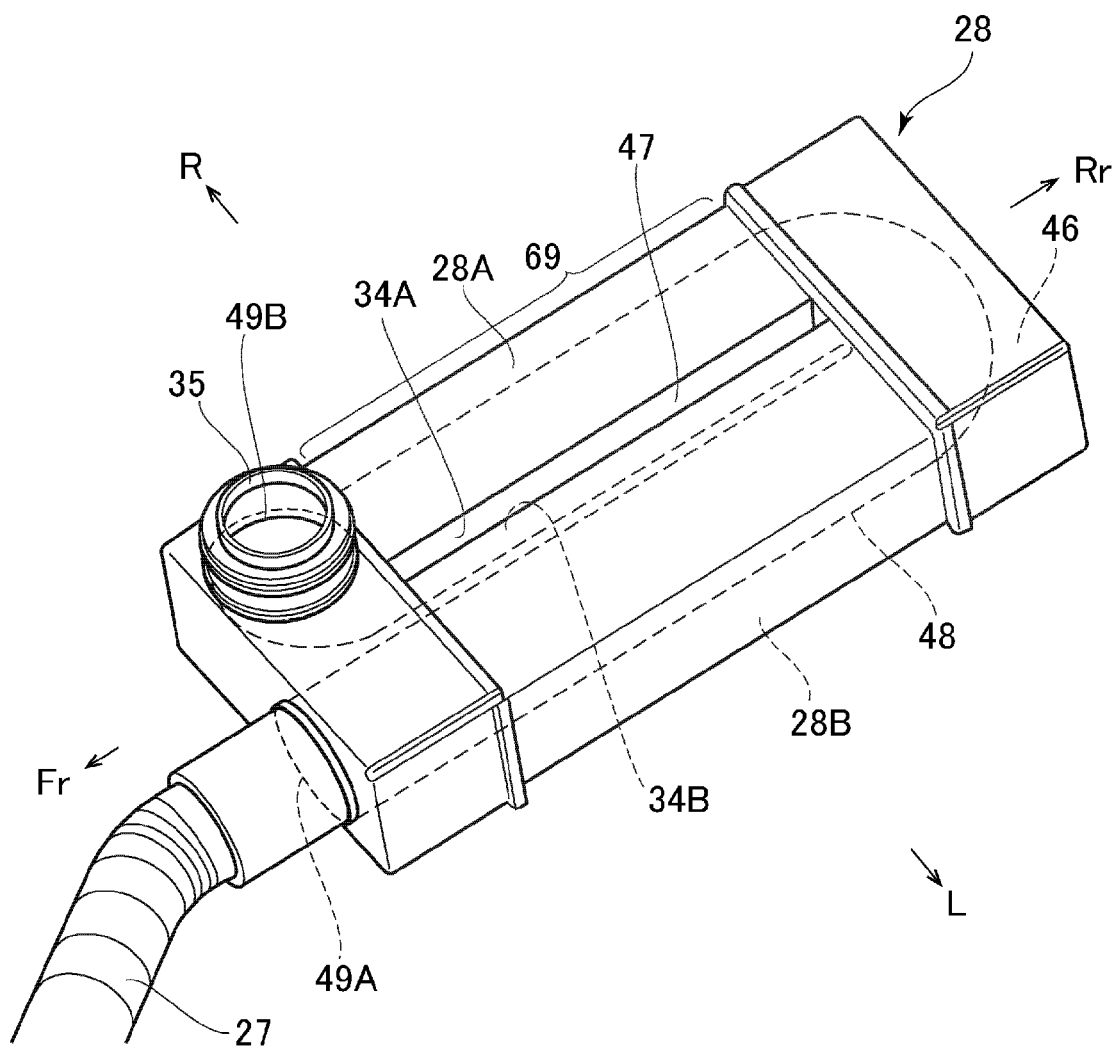
FIG. 27 is a perspective view of an intercooler of the third embodiment.

Next, a motorcycle of a third embodiment will be described. A cooling structure of an intercooler of the present embodiment is different from that of the first and second embodiments. Hereinafter, the cooling structure of the intercooler of the present embodiment will be described while referring to FIG. 23 to FIG. 34. FIG. 23 is a side view of the motorcycle. FIG. 24 is a perspective view of the motorcycle when seen from the rear side. FIG. 25 is a perspective view of a periphery of an engine unit. FIG. 26 is a top view of the engine unit. FIG. 27 is a perspective view of the intercooler. Note that the configuration same as that of the first embodiment is denoted by the same reference numeral, and explanation thereof will be omitted.

As illustrated in FIG. 23, a front portion of a vehicle body of the motorcycle of the present embodiment is covered by a front cowling 124. The front cowling 124 is attached, via the vehicle body frames 101 and the like, at a position above the front wheel 106 and in front of the steering head pipe 102. The front cowling 124 is formed in a manner that a front portion thereof has a curved streamlined shape so that a resistance due to a traveling air can be reduced.

Both right and left sides and a rear side of the vehicle body are covered by a tail cowling 125. The tail cowling 125 is attached via the vehicle body frames 101 and the like. The tail cowling 125 is formed to be inclined upward and tapered as it directs toward the rear side of the vehicle body.

Here, the intercooler 28 exhibits a substantially thin box shape being hollow, and is disposed substantially horizontally in a side view of the vehicle body in which a longitudinal direction thereof extends in the front-and-rear direction of the vehicle body. More concretely, the intercooler 28 is disposed so that a rear side thereof is inclined moderately upward. Here, the substantial horizontality indicates that an inclination angle α in the longitudinal direction of the intercooler 28 with respect to a horizontal plane (refer to FIG. 23) is an angle closer to a horizontal angle, compared to a vertical angle, namely, the inclination angle is 0° or more and less than 45°. Note that the substantial horizontality may also indicate that the inclination angle α is 0° or more and less than 30°. By disposing the intercooler 28 substantially horizontally as above, when compared to a case where the intercooler 28 is disposed in the vertical direction, there is no need to secure a large installation space in the vertical direction, resulting in that a capacity of the fuel tank 117 can be increased, for example.

Note that the inclination angle α in the longitudinal direction of the intercooler 28 is preferably greater than 0°. By making the inclination angle α to be greater than 0°, it is possible to further reduce a bending of a later-described introducing duct portion 51 to enable a traveling air to easily flow.

A configuration of the intercooler 28 of the present embodiment will be described in detail. FIG. 27 is a perspective view of the intercooler 28. As illustrated in FIG. 27, on a front surface of the box shape of the intercooler 28, an inlet port 49A for connecting the air feed pipe 27 from the front side is formed. Partition plates 34A and 34B are provided along the longitudinal direction at a center of the inside of the intercooler 28, resulting in that the inner space is partitioned into right and left parts. The partition plates 34A and 34B are connected to a front end of the intercooler 28, and are mutually coupled at a position on a rear side without reaching a rear end of the intercooler 28. Therefore, at a rear end portion in the intercooler 28, there is formed a communication portion 46 which makes the right and left spaces partitioned by the partition plates 34A and 34B to be communicated with each other. Further, by providing an interval, in the vehicle width direction, between the partition plates 34A and 34B, a ventilation portion 47 which penetrates in the up-and-down direction, is formed at a center of the intercooler 28 along the longitudinal direction of the intercooler 28. Further, on an upper surface of a front end portion of the box shape of the intercooler 28, there is formed an outlet port 49B for connecting the outlet pipe 35 from above.

In the intercooler 28 of the present embodiment, a pipe 48 extended from the inlet port 49A to reach the outlet port 49B is laid. The pipe 48 is disposed by being curved and turned back in a U-shape at the communication portion 46. Therefore, in the intercooler 28, there is formed a flow path in which a compressed air passes through the pipe 48 to flow on the left side of the intercooler 28 from the front side to the rear side, the air is then turned back at the communication portion 46, and flows on the right side of the intercooler 28 from the rear side to the front side. By laying the pipe 48 in the intercooler 28, the air can be smoothly flowed from the inlet port 49A to the outlet port 49B.

Further, an upper surface and a lower surface of the intercooler 28 are formed to have a wide area, so that they function as heat-radiating surfaces which radiate heat of the compressed air. Here, the upper surface of the intercooler 28 is set to a heat-radiating surface 28A on one side, and the lower surface of the intercooler 28 is set to a heat-radiating surface 28B on the other side. When the compressed air flows through the intercooler 28 in which the flow path is formed to have a long length by being turned back, a heat is radiated mainly from the heat-radiating surface 28A on one side and the heat-radiating surface 28B on the other side.

Figure 28:
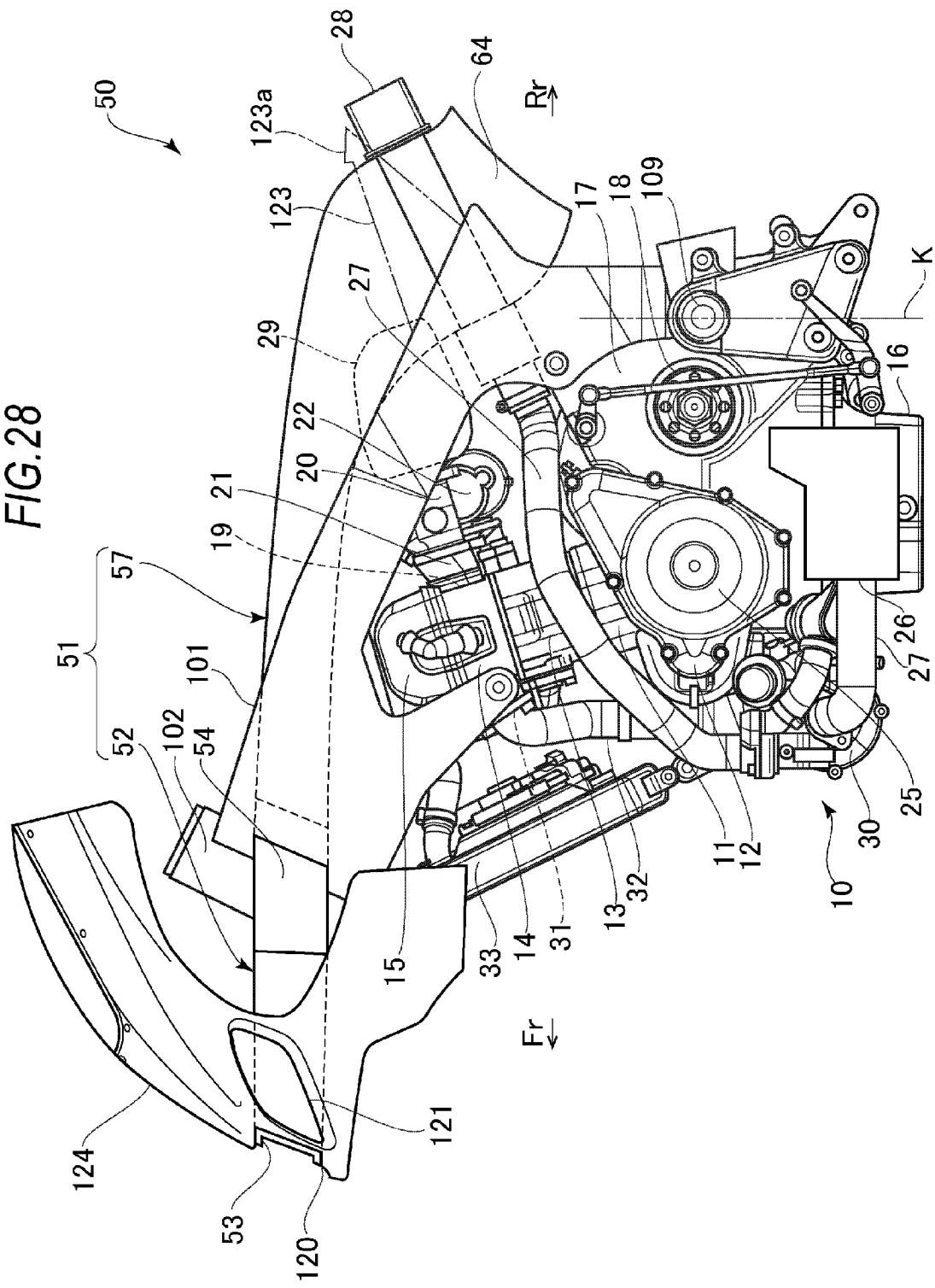
FIG. 28 is a left side view illustrating a configuration of a duct hose part of the third embodiment.
Figure 29:
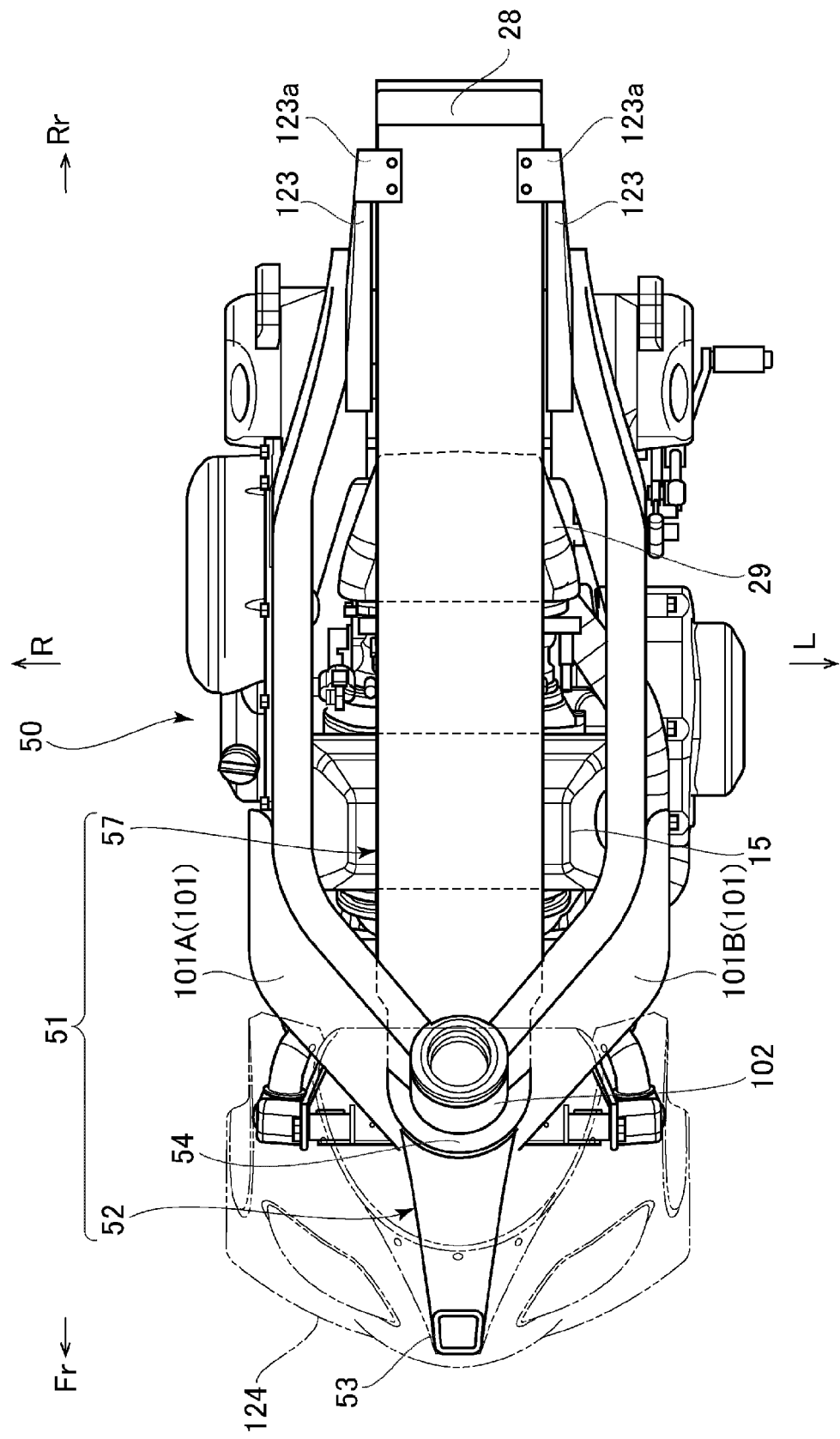
FIG. 29 is a top view illustrating the configuration of the duct hose part of the third embodiment.
Figure 30:
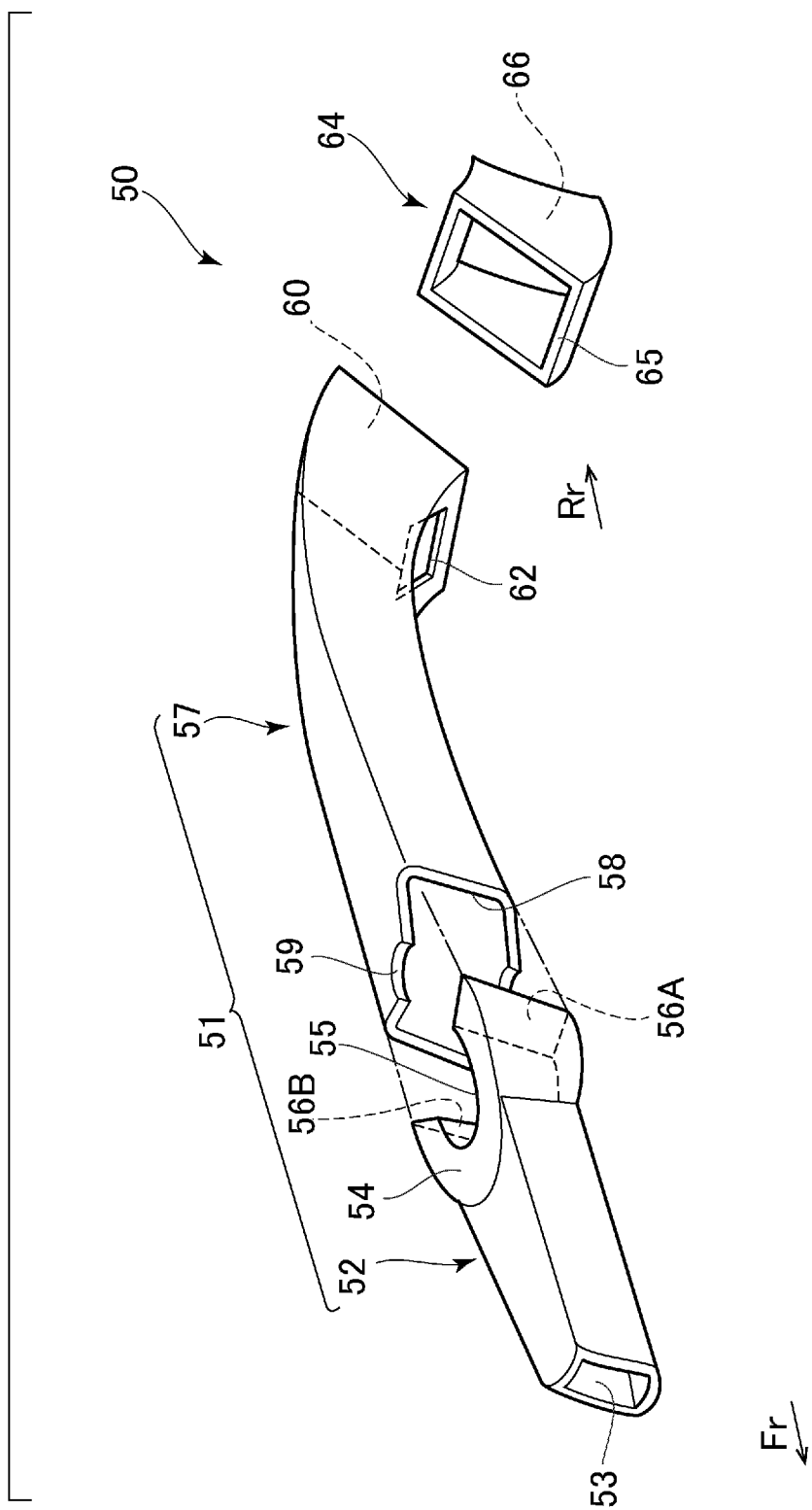
FIG. 30 is a perspective view illustrating the configuration of the duct hose part of the third embodiment.
Figure 31:
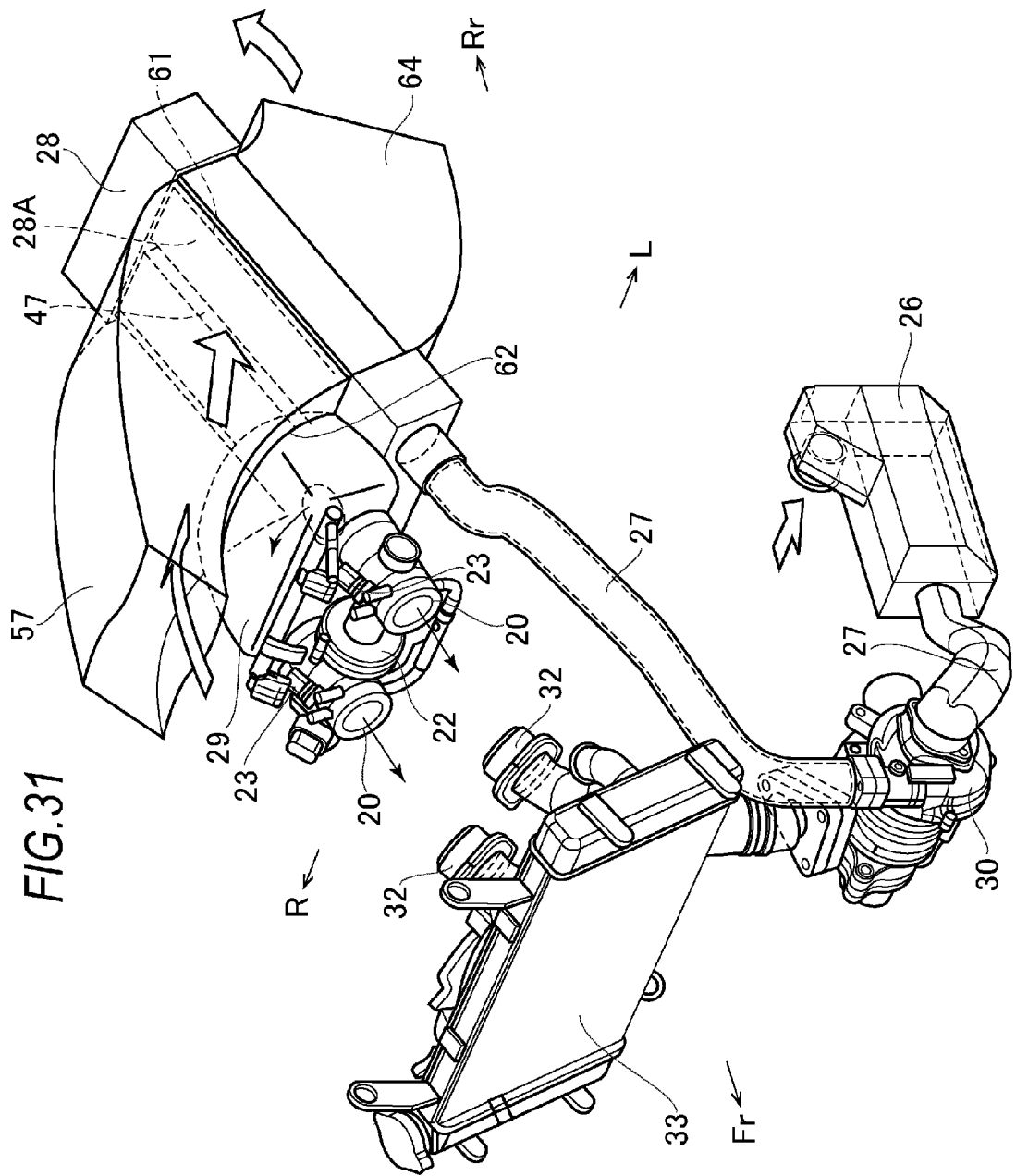
FIG. 31 is a perspective view illustrating a state in which the duct hose part and the intercooler of the third embodiment are coupled.

Next, in order to efficiently cool the intercooler 28, the present embodiment is provided with a duct hose part 50 which leads a traveling air to the heat-radiating surface 28A on one side of the intercooler 28 and discharges the air to the rear side of the vehicle body. FIG. 28 is a left side view illustrating a configuration of the duct hose part 50. FIG. 29 is a plan view illustrating a configuration of the duct hose part 50. FIG. 30 is a perspective view illustrating a configuration of the duct hose part 50. FIG. 31 is a perspective view illustrating a state where the duct hose part 50 and the intercooler 28 are coupled.

The duct hose part 50 is disposed substantially linearly from the front portion of the vehicle body to the intercooler 28 by passing through a part between the vehicle body frames 101 (a pair of frames 101A and 101B) and the lower side of the fuel tank 117.

Concretely, the duct hose part 50 has an introducing duct portion 51 which takes the traveling air therein and leads the air to the intercooler 28, and a discharge duct portion 64 which discharges the traveling air after cooling the intercooler 28.

Figure 32:
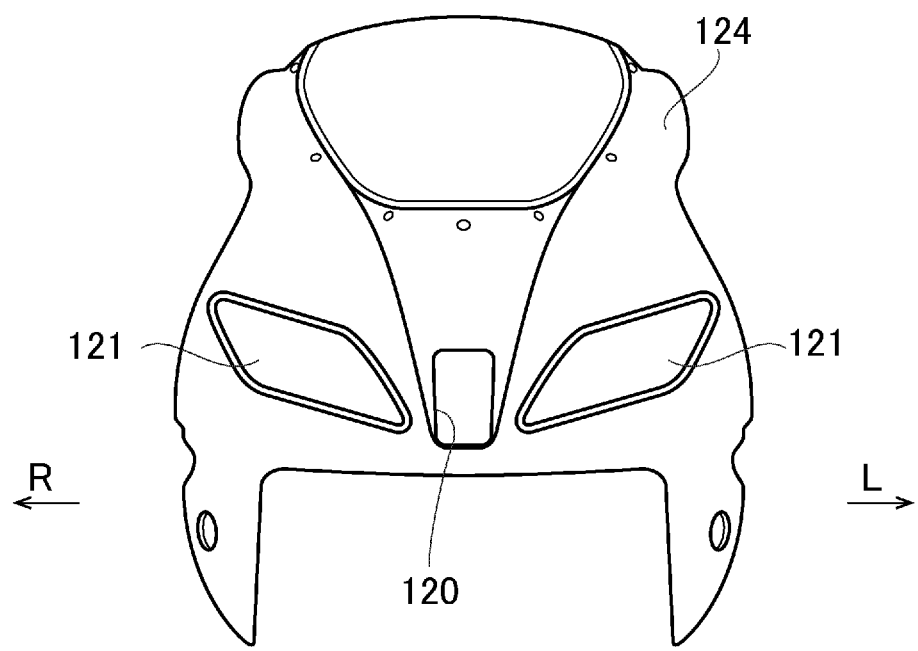
FIG. 32 is a front view of a front cowling of the third embodiment.

The introducing duct portion 51 of the present embodiment has a first introducing duct 52 and a second introducing duct 57. The first introducing duct 52 is formed in a hollow shape by using a synthetic resin, for example, and is extended substantially linearly from a rear surface of the front cowling 124 to the steering head pipe 102 along the front-and-rear direction. A front opening 53 which is opened toward the front side is formed on the first introducing duct 52, and is communicated with an introducing hole 120 formed on the front cowling 124 (refer to FIG. 32). FIG. 32 is a front view of the front cowling 124. The introducing hole 120 of the front cowling 124 of the present embodiment is formed at a front end portion of the front cowling 124, more concretely, at a position between right and left head lamps 121, namely, at a position at a center in the vehicle body width direction and at which a pressure of the traveling air becomes high. The front cowling 124 and the first introducing duct 52 are coupled by being tightly brought into contact with each other with no gap therebetween so that the traveling air flows from the introducing hole 120 into the front opening 53 with no leakage of the air.

Further, on a rear portion of the first introducing duct 52, a branched portion 54 branched into a two-pronged shape in the vehicle body width direction is formed. The branched portion 54 of the present embodiment is formed to have a semicircular shape so as to surround a part of a front side of the steering head pipe 102. As illustrated in FIG. 30, the branched portion 54 has a cutout portion 55 cut-out in an arc shape whose radius of curvature is substantially the same as that of the steering head pipe 102, at a position at which it faces the steering head pipe 102, and thus it is formed to be able to be tightly brought into contact with the steering head pipe 102. Further, on respective rear ends of the first introducing duct 52 branched by the branched portion 54, rear openings 56A and 56B are formed, and are communicated with respective through holes 122A and 122B (refer to FIG. 26) formed on front portions of the vehicle body frames 101.

As illustrated in FIG. 26, the through holes 122A and 122B of the present embodiment are formed by being penetrated along the front-and-rear direction, at the front portions of the vehicle body frames 101 and at both sides with the steering head pipe 102 sandwiched therebetween. Further, the through holes 122A and 122B have shapes of openings which are substantially the same as those of the rear openings 56A and 56B of the respective rear ends of the first introducing duct 52. The first introducing duct 52 and the vehicle body frames 101 are coupled by being tightly brought into contact with each other with no gap therebetween so that the traveling air can flow from the rear openings 56A and 56B into the respective through holes 122A and 122B with no leakage of the air. Note that it is also possible that the first introducing duct 52 and the vehicle body frames 101 are coupled by directly inserting the respective rear ends of the branched portion 54 of the first introducing duct 52 into the through holes 122A and 122B.

The second introducing duct 57 is formed in a hollow shape by using a synthetic resin, for example, and is extended substantially linearly from the steering head pipe 102 to the intercooler 28 along the front-and-rear direction. The second introducing duct 57 passes through the lower side of the fuel tank 117 as illustrated in FIG. 23, and passes through a part between the pair of right and left frames 101A and 101B being the vehicle body frames 101 to reach the intercooler 28, as illustrated in FIG. 29.

Further, a front opening 58 which is opened toward the front side is formed on the second introducing duct 57, and is communicated with the through holes 122A and 122B of the vehicle body frames 101. The front opening 58 is formed in a size covering the two through holes 122A and 122B. Further, a front end of the second introducing duct 57 has a cutout portion 59 cut-out in an arc shape whose radius of curvature is substantially the same as that of the steering head pipe 102, and thus the second introducing duct 57 is formed to be able to be tightly brought into contact with the steering head pipe 102. The vehicle body frames 101 and the second introducing duct 57 are coupled by being tightly brought into contact with each other with no gap therebetween so that the traveling air can flow from the through holes 122A and 122B into the front opening 58 with no leakage of the air.

Further, the second introducing duct 57 is formed in a manner that a rear portion thereof is curved by being directed moderately downward, and a rear opening 60 which is opened toward the rear side and the lower side is formed on the second introducing duct 57. The rear opening 60 faces the heat-radiating surface 28A on one side of the intercooler 28, and is formed in a size which coincides with a shape of a center portion (an area 69 indicated in FIG. 27) of the heat-radiating surface 28A except for a front end portion and a rear end portion of the surface. At this time, since the rear portion of the second introducing duct 57 is curved, a direction of flow path on the rear portion side of the second introducing duct 57 can be made to be substantially orthogonal to the heat-radiating surface 28A of the intercooler 28 disposed by being inclined.

As illustrated in FIG. 31, the second introducing duct 57 and the intercooler 28 are coupled by being sealed so that they can be brought into contact with each other with no leakage of traveling air from the rear opening 60 to the heat-radiating surface 28A. Here, the second introducing duct 57 and the intercooler 28 are sealed by making a seal member 61 to be interposed at a portion at which an opening end of the rear opening 60 and the heat-radiating surface 28A are brought into contact with each other.

Note that at a position which is on a lower surface of the second introducing duct 57 and in proximity to the rear opening 60, a lower opening 62 is formed. The lower opening 62 is formed in a size by which a rear end portion of the surge tank 29 can be inserted into the opening. Therefore, a part of the surge tank 29 is exposed in the second introducing duct 57. Note that the lower opening 62 and the surge tank 29 are tightly brought into contact with each other so that the traveling air does not leak from the lower opening 62.

Next, the discharge duct portion 64 is formed in a hollow shape by using a synthetic resin, for example, and is extended toward the rear side of the vehicle body by being curved from the intercooler 28. As illustrated in FIG. 23, the discharge duct portion 64 is disposed at a position below the tail cowling 125 and in front of the rear wheel 111. Further, as illustrated in FIG. 28, a front end of the discharge duct portion 64 is positioned behind a vertical line K passing through an axis of the pivot shaft 109, and a rear end thereof is positioned behind an attachment portion 123a of a seat rail 123.

As illustrated in FIG. 30, a front opening 65 which is opened toward the front side and the upper side is formed on the discharge duct portion 64. The front opening 65 faces the heat-radiating surface 28B on the other side of the intercooler 28, and is formed in a size which coincides with a shape of a center portion of the heat-radiating surface 28B. The intercooler 28 and the discharge duct portion 64 are coupled by being sealed with no gap therebetween so that the traveling air after cooling the heat-radiating surface 28A and the heat-radiating surface 28B does not leak.

Figure 33:
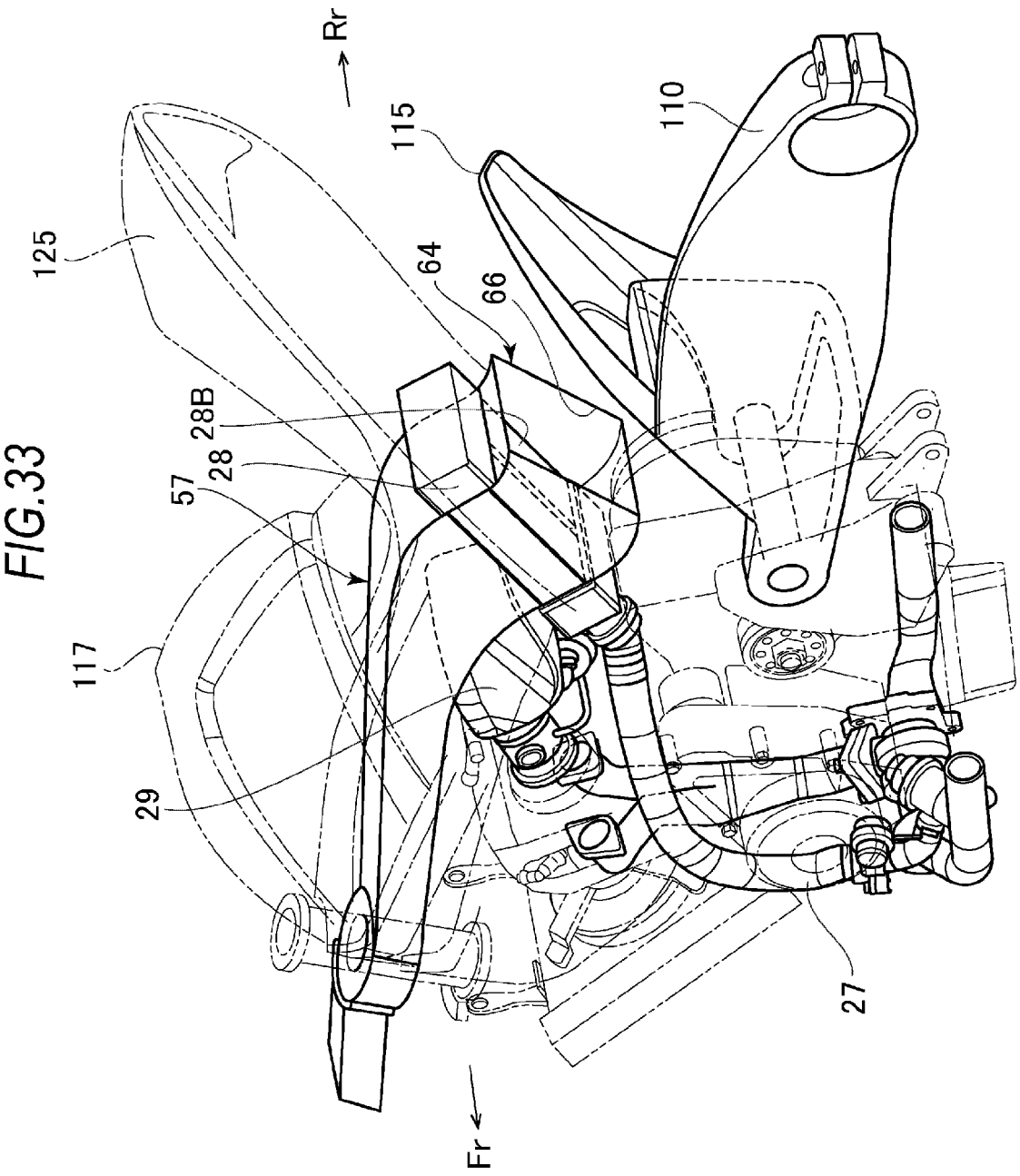
FIG. 33 is a perspective view illustrating a discharge direction of a discharge duct portion of the third embodiment.

Further, a discharge portion 66 which is opened toward the rear side and the lower side is formed on the discharge duct portion 64. Further, FIG. 33 is a perspective view illustrating a discharge direction of the discharge duct portion 64. As illustrated in FIG. 33, the direction of opening of the discharge portion 66 of the present embodiment is directed toward a space between the tail cowling 125 and the rear wheel 111, concretely, toward the inner fender 115.

Figure 34:
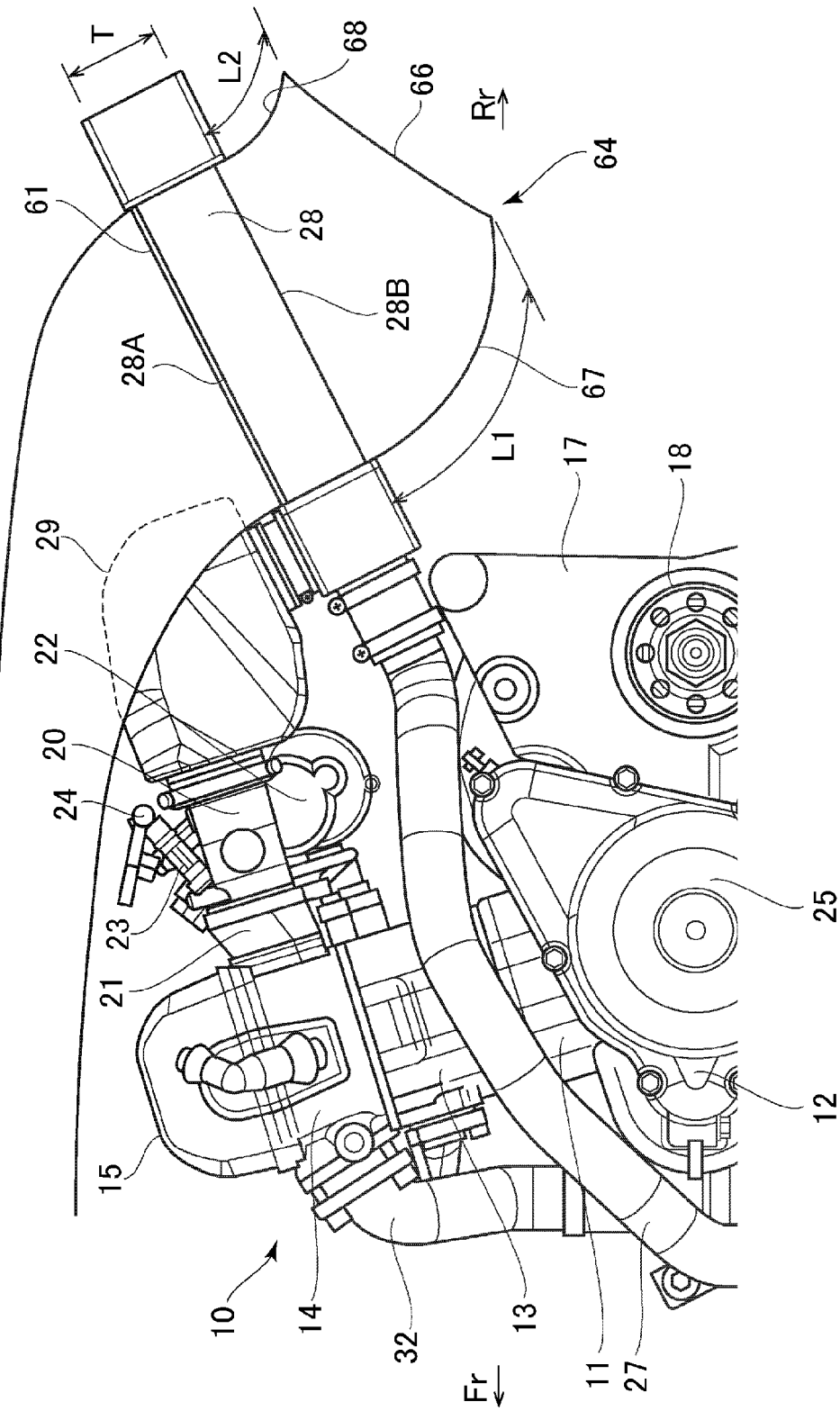
FIG. 34 is a side view illustrating a relationship between a shape of the discharge duct portion and the intercooler of the third embodiment.

FIG. 34 is a side view illustrating a relationship between a shape of the discharge duct portion 64 and the intercooler 28.

As illustrated in FIG. 34, a lower surface 67 and an upper surface 68 of the discharge duct portion 64 are respectively formed in arc shapes to be substantially parallel to each other, and thus the discharge duct portion 64 exhibits a curved shape as a whole. In the present embodiment, a length (length of arc-shaped portion) L1 of a side along the discharge direction of the discharge duct portion 64 (corresponding to the lower surface 67) is set to be longer than a length (length of arc-shaped portion) L2 of a side along the discharge direction (corresponding to the upper surface 68). Therefore, it is possible to make the discharge direction of the traveling air after cooling the intercooler 28 to be directed to the predetermined direction.

Further, out of the lengths of the sides along the discharge direction of the discharge duct portion 64, the length L2 on a side of the short side with shorter length is set to be greater than a distance between the heat-radiating surface 28A on one side and the heat-radiating surface 28B on the other side, namely, a thickness T of the intercooler 28. As above, by setting the length L2 along the discharge direction of the discharge duct portion 64 to be greater than the thickness T, it is possible to efficiently discharge the traveling air after cooling the intercooler 28.

Next, a process from when the intercooler 28 is cooled by the traveling air that flows through the aforementioned duct hose part 50 to when the traveling air is discharged, will be described. When the motorcycle 100 is traveled, the traveling air flows into the first introducing duct 52 by passing through the introducing hole 120 of the front cowling 124 and the front opening 53. The introducing hole 120 of the front cowling 124 is formed at a position at which a pressure of the traveling air becomes high, so that the traveling air can be easily flowed into the first introducing duct 52.

Thereafter, the traveling air is branched into right and left of the steering head pipe 102 by the branched portion 54, and flows into the second introducing duct 57 by passing through the rear openings 56A and 56B, the through holes 122A and 122B of the vehicle body frames 101, and the front opening 58. A part of the traveling air flows along a surface of the surge tank 29 in which a part thereof is exposed in the second introducing duct 57, so that the traveling air is directed toward the intercooler 28 while cooling the air accumulated in the surge tank 29.

The traveling air passes through the rear portion of the second introducing duct 57 to reach the heat-radiating surface 28A on one side of the intercooler 28. Here, the rear portion of the second introducing duct 57 is formed by being curved, and is substantially orthogonal to the heat-radiating surface 28A of the intercooler 28, so that the traveling air can cool the heat-radiating surface 28A by being securely blown to the heat-radiating surface 28A. Further, the introducing duct portion 51 from the front opening 53 to the rear opening 60 reaching the intercooler 28, is disposed substantially linearly, which enables the traveling air to be easily flowed, and to efficiently cool the intercooler 28.

The traveling air after cooling the heat-radiating surface 28A passes through the ventilation portion 47 formed on the intercooler 28 to be flowed out to the heat-radiating surface 28B side. The intercooler 28 is cooled also by the traveling air passing through the ventilation portion 47.

The traveling air after passing through the ventilation portion 47 to be flowed out to the heat-radiating surface 28B side, is guided by the discharge duct portion 64 to be discharged to the rear side of the vehicle body. Concretely, the traveling air is discharged toward a space between the tail cowling 125 and the rear wheel 111, namely, toward the inner fender 115. The space between the tail cowling 125 and the rear wheel 111 is covered from the front side by the engine unit 10 and the like, and thus has a low pressure (negative pressure), so that the traveling air is sucked out. Specifically, the inlet side of the duct hose part 50 has a high pressure, and the outlet side of the duct hose part 50 has a low pressure, which enables the traveling air to be easily flowed, resulting in that the intercooler 28 can be efficiently cooled. Further, by making the discharge direction of the traveling air to be directed to the inner fender 115, the traveling air with high temperature after cooling the intercooler 28 is not diffused, so that a heat damage with respect to the passenger can be reduced.

According to the third embodiment, since the duct hose part 50 is disposed substantially linearly from the front portion of the vehicle body to the intercooler 28, the traveling air easily flows to the heat-radiating surface 28A of the intercooler 28, resulting in that the intercooler 28 can be efficiently cooled.

Further, since the duct hose part 50 has the discharge duct portion 64 which is disposed toward the rear side of the vehicle body from the intercooler 28, it is possible to set efficient discharge direction and form of discharge in accordance with models.

Further, out of the lengths of the sides along the discharge direction of the discharge duct portion 64, the length L2 on the side of the short side is set to be greater than the thickness T of the intercooler 28, so that it is possible to efficiently discharge the traveling air after cooling the intercooler 28.

Next, a modified example in which a discharge duct portion 70 is extended to the rear portion of the vehicle body, will be described. Note that the other configuration is similar to that of the above-descried embodiment, and explanation thereof will be omitted by giving the same reference numeral thereto.

Figure 35:
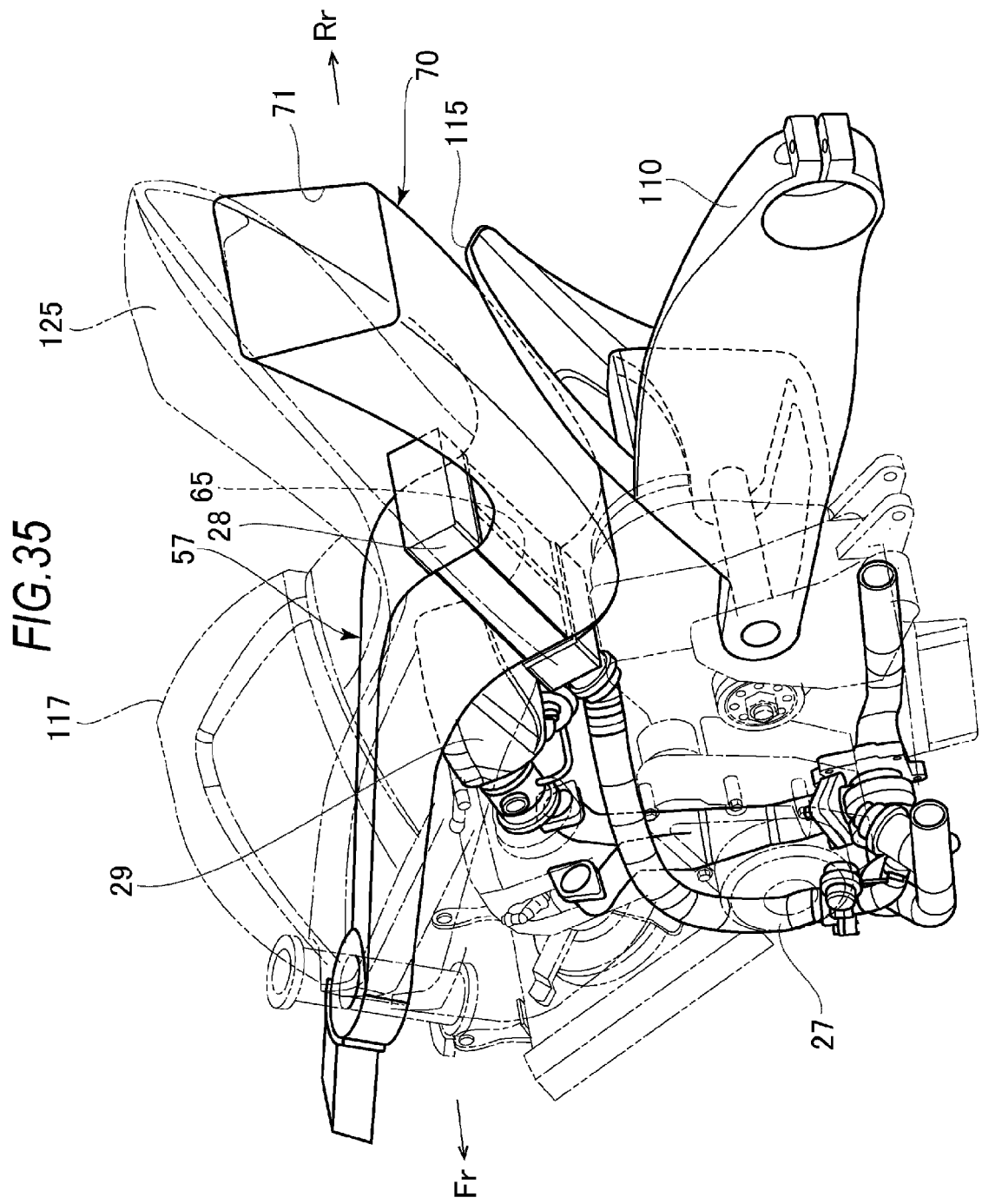
FIG. 35 is a perspective view illustrating a modified example of the discharge duct portion of the third embodiment.

FIG. 35 is a perspective view illustrating a configuration of the discharge duct portion 70 of the modified example.

The discharge duct portion 70 is curved from the intercooler 28, and then is extended to the rear end of the tail cowling 125 by being inclined upward as it directs toward the rear side of the vehicle body. Concretely, the discharge duct portion 70 is extended in substantially parallel with the tail cowling 125. The rear side of the rear end of the tail cowing 125 has a low pressure (negative pressure) due to a shape of the tail cowling 125 which inclines as it directs toward the rear side of the vehicle body, so that the traveling air is sucked out, and can be efficiently discharged. Further, an opening area of the discharge duct portion 70 is gradually increased from the intercooler 28 side toward the discharge direction, and an opening area of a discharge portion 71 is larger than an opening area of the front opening 65, so that the traveling air can be efficiently discharged.

Next, a modified example in which a discharge duct portion 80 is branched into a plurality of portions to be extended to the rear portion of the vehicle body, will be described. Note that the other configuration is similar to that of the above-descried embodiment, and explanation thereof will be omitted by giving the same reference numeral thereto.

Figure 36:
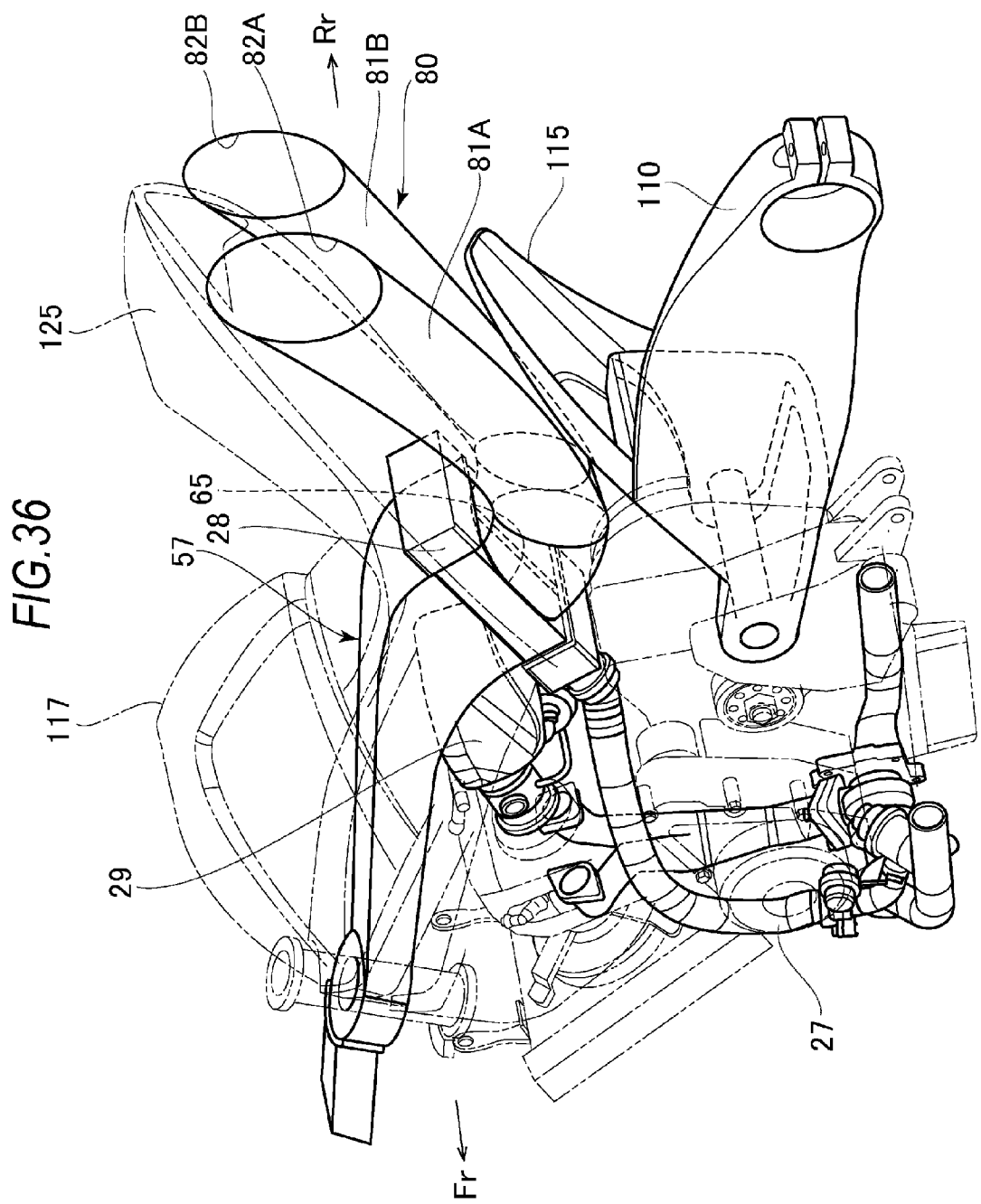
FIG. 36 is a perspective view illustrating a modified example of the discharge duct portion of the third embodiment.

FIG. 36 is a perspective view illustrating a configuration of the discharge duct portion 80 of the modified example.

The discharge duct portion 80 is curved from the intercooler 28, and two discharge ducts 81A and 81B branched into right and left from the middle, are extended to the rear end of the tail cowling 125 by being inclined upward as they direct toward the rear side of the vehicle body. Concretely, the discharge ducts 81A and 81B are extended in substantially parallel with the tail cowling 125. Further, an opening area of the discharge duct portion 80 is gradually increased from the intercooler 28 side toward the discharge direction, and an opening area as a result of combining an opening area of a discharge portion 82A of the discharge duct 81A and an opening area of a discharge portion 82B of the discharge duct 81B is larger than an opening area of the front opening 65, so that the traveling air can be efficiently discharged.

The aforementioned third embodiment describes a case where the pipe 48 is laid in the intercooler 28, but, it is also possible to omit the pipe 48.

Further, in the aforementioned third embodiment, it is possible to omit the lower opening 62 of the second introducing duct 57 by reducing a size of the surge tank 29, and it is also possible to omit the surge tank 29 and to directly connect the intercooler 28 to the throttle bodies 20.

In the foregoing, the present invention is described together with various embodiments, but, the present invention is not limited only to these embodiments, and changes and so on can be made within the scope of the present invention, and the respective embodiments can also be combined appropriately.

In the above-described respective embodiments, a description is given, taking the water-cooled parallel two-cylinder engine as an example, but, the number of cylinders, a cooling method, and so on of the engine 11 are appropriately selectable, and the present invention is also applicable to, for example, an air-cooled engine with a single cylinder or three cylinders or more.

Note that the configuration of the supercharging system and the cooling structure of the intercooler of the above-described embodiments can be applied not only to the motorcycle but also to a vehicle such as, for example, a saddle type vehicle (three-wheel scooter, ATV or the like), a snowmobile, and a personal watercraft. These are also vehicles in which a throttle operation significantly exerts an effect on a vehicle body stability, similar to the motorcycle, so that by applying the present invention to the vehicles, it is possible to expect a particular improvement of operability and riding comfortability.

According to the present invention, by disposing the intercooler at the position adjacent to the surge tank, an air path between the intercooler and the surge tank can be shortened, resulting in that a throttle response is improved. Further, it is possible to reduce the number of pipes, which leads to the weight reduction and the reduction of the number of parts. Further, by disposing the intercooler at the position behind the engine, it is possible to facilitate the layout of a part in front of the engine where the radiator, the exhaust pipes, and the supercharger are disposed.

Further, by disposing the supercharger at the position in front of the intercooler, the supercharger is disposed in the vicinity of the engine, which means that the intake system parts can be concentrated, resulting in that the pipes can be shortened and simplified.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A motorcycle comprising:
   a pair of left and right vehicle body frames extending in a front-and-rear direction;
   an engine having one or more exhaust ports to which one or more exhaust pipes is/are connected at a front side of a cylinder head, and one or more intake ports to which one or more throttle bodies is/are connected at a rear side of the cylinder head;
   a supercharger disposed at a front side of the engine, and compressing a sucked air for combustion;
   an intercooler cooling the air compressed by the supercharger; and
   a surge tank making the air from the intercooler flow to the one or more throttle bodies,
   wherein the one or more throttle bodies and the surge tank are disposed behind the cylinder head, and the intercooler is disposed by being adjacent to the surge tank at a position behind the cylinder head and the one or more throttle bodies, positioned between the pair of left and right vehicle body frames in a view seen from an upper direction of the vehicle body, disposed inclined so that a front side thereof is lowered, and a wind-receiving surface is directed diagonally forward;
   wherein the supercharger is provided in front of the intercooler.

2. The motorcycle according to claim 1, wherein an inlet port and an outlet port of air are set on one side of the intercooler, and an internal air flow path of the intercooler has a shape of substantially U-shape.

3. The motorcycle according to claim 1, wherein the intercooler is disposed below a seating seat, and at least a part of the intercooler is positioned behind a front end of the seating seat in a plan view of a vehicle body.

4. The motorcycle according to claim 1, wherein the intercooler is disposed in a manner that a heat-radiating surface side thereof faces a space above a rear wheel.

5. The motorcycle according to claim 1, wherein a part of the intercooler is overlapped with the surge tank in an up-and-down direction.

6. The motorcycle according to claim 1, wherein the intercooler is disposed so that a longitudinal direction thereof extends in a front-and-rear direction of the vehicle body.

7. A motorcycle comprising:
   an engine having one or more exhaust ports to which one or more exhaust pipes is/are connected at a front side of a cylinder head, and one or more intake ports to which one or more throttle bodies is/are connected at a rear side of the cylinder head;
   a supercharger disposed at a front side of the engine, and compressing a sucked air for combustion;
   an intercooler cooling the air compressed by the supercharger;
   a surge tank making the air from the intercooler flow to the one or more throttle bodies; and
   a bypass pipe whose one end is connected to an intermediate portion of a coupling pipe which connects the supercharger and the intercooler, and whose other end is connected to the surge tank or an intermediate portion of an outlet pipe which connects the intercooler and the surge tank,
   wherein a control valve which controls an opening/closing of the bypass pipe is provided in the middle of the bypass pipe;
   wherein the one or more throttle bodies and the surge tank are disposed behind the cylinder head, and the intercooler is disposed by being adjacent to the surge tank at a position behind the cylinder head and the one or more throttle bodies; and
   wherein the supercharger is provided in front of the intercooler.

8. The motorcycle according to claim 7, further comprising a second surge tank which is different from the surge tank connected to the one or more throttle bodies, wherein the second surge tank is provided on the coupling pipe.

9. The motorcycle according to claim 7, further comprising an accumulating device operating to maintain a pressure of accumulated gas, wherein the accumulating device is provided on the coupling pipe.

10. The motorcycle according to claim 7, further comprising a third surge tank directly connected to the surge tank.

11. The motorcycle according to claim 7, further comprising a second accumulating device directly connected to the surge tank.

12. A motorcycle comprising:
- an engine having one or more exhaust ports to which one or more exhaust pipes is/are connected at a front side of a cylinder head, and one or more intake ports to which one or more throttle bodies is/are connected at a rear side of the cylinder head;
- a supercharger disposed at a front side of the engine, and compressing a sucked air for combustion;
- an intercooler cooling the air compressed by the supercharger; and
- a surge tank making the air from the intercooler flow to the one or more throttle bodies
- a duct hose part leading a traveling air introduced from a front portion of the vehicle body to a heat-radiating surface of the intercooler to discharge the traveling air to a rear side of the vehicle body
- wherein the one or more throttle bodies and the surge tank are disposed behind the cylinder head, and the intercooler is disposed by being adjacent to the surge tank at a position behind the cylinder head and the one or more throttle bodies;
- wherein the supercharger is provided in front of the intercooler;
- wherein the engine is supported by a pair of frames extended from a steering head pipe toward a rear side and a lower side of the vehicle body; and
- wherein the duct hose part disposed substantially linearly from the front portion of the vehicle body to the intercooler by passing through a part between the pair of frames and a lower side of a fuel tank.

13. The motorcycle according to claim 12, further comprising an inner fender covering a rear wheel from above, at a position between the rear wheel and a tail cowling, wherein the duct hose part has an introducing duct portion disposed substantially linearly from a front end of a front cowling to the intercooler, and a discharge duct potion disposed from the intercooler toward the rear side of the vehicle body, wherein the discharge duct portion discharges the traveling air after passing through the heat-radiating surface toward the inner fender.

14. The motorcycle according to claim 12, wherein the duct hose part has an introducing duct portion disposed substantially linearly from a front end of a front cowling to the intercooler, and a discharge duct potion disposed from the intercooler to a rear end of a tail cowling, wherein an opening area of a discharge portion of the discharge duct portion is formed to be larger than an opening area of the discharge duct portion in proximity to the intercooler, and the discharge duct portion discharges the traveling air after passing through the heat-radiating surface toward the rear side of the vehicle body.

15. The motorcycle according to claim 13, wherein a length on a side of a short side, out of lengths of sides along a discharge direction of the discharge duct portion, is greater than a thickness of the intercooler when seen from a side.

16. The motorcycle according to claim 1, wherein the intercooler is disposed above a crankcase of the engine; and wherein the supercharger is disposed below the intercooler.

17. The motorcycle according to claim 16 further comprising an air cleaner which cleans taken air for combustion, wherein the air cleaner is disposed behind the supercharger and on a side lower portion of the crankcase.

* * * * *